Dec. 30, 1952     R. R. WILSON     2,624,009
ION SOURCES
Filed Dec. 31, 1946     8 Sheets-Sheet 1
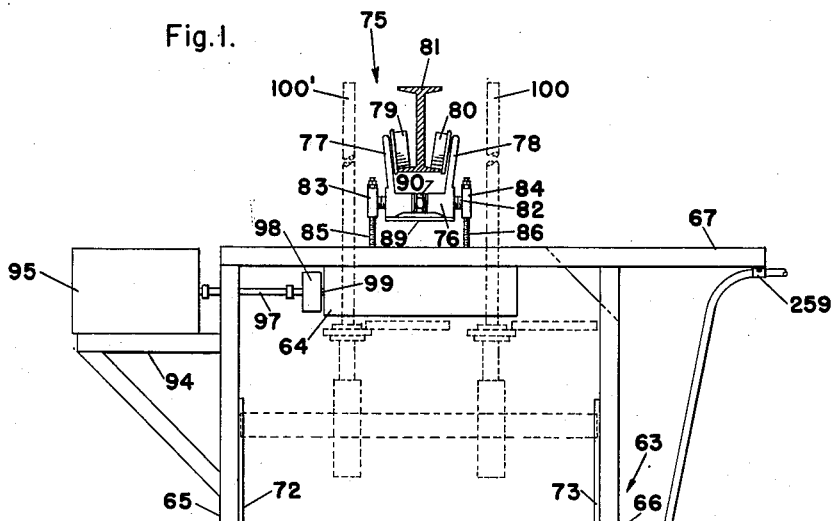
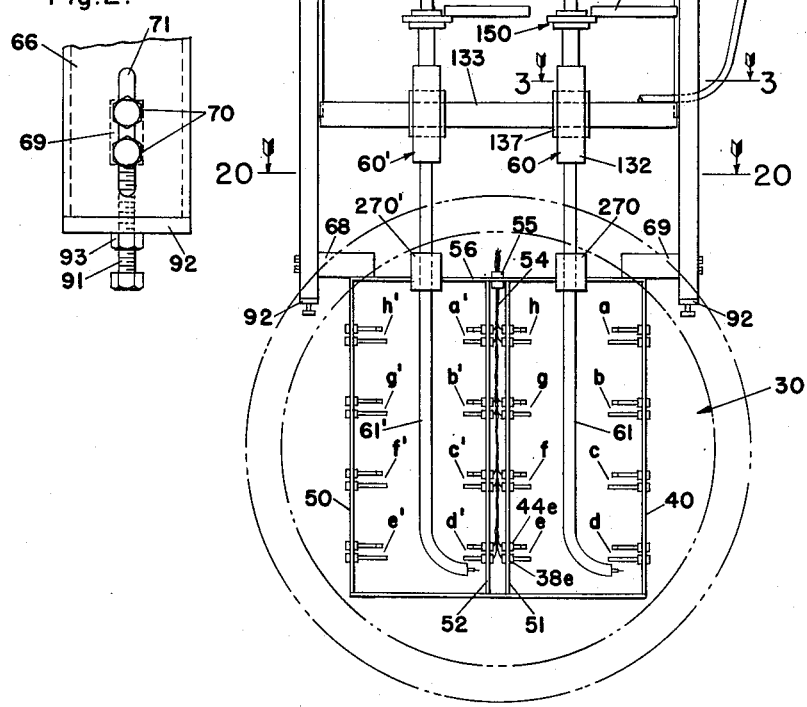
Inventor
ROBERT R. WILSON Dec. 30, 1952   R. R. WILSON   2,624,009
ION SOURCES Filed Dec. 31, 1946   8 Sheets-Sheet 2

Inventor
ROBERT R. WILSON
By Robert A. Lavender
Attorney

Inventor
ROBERT R. WILSON

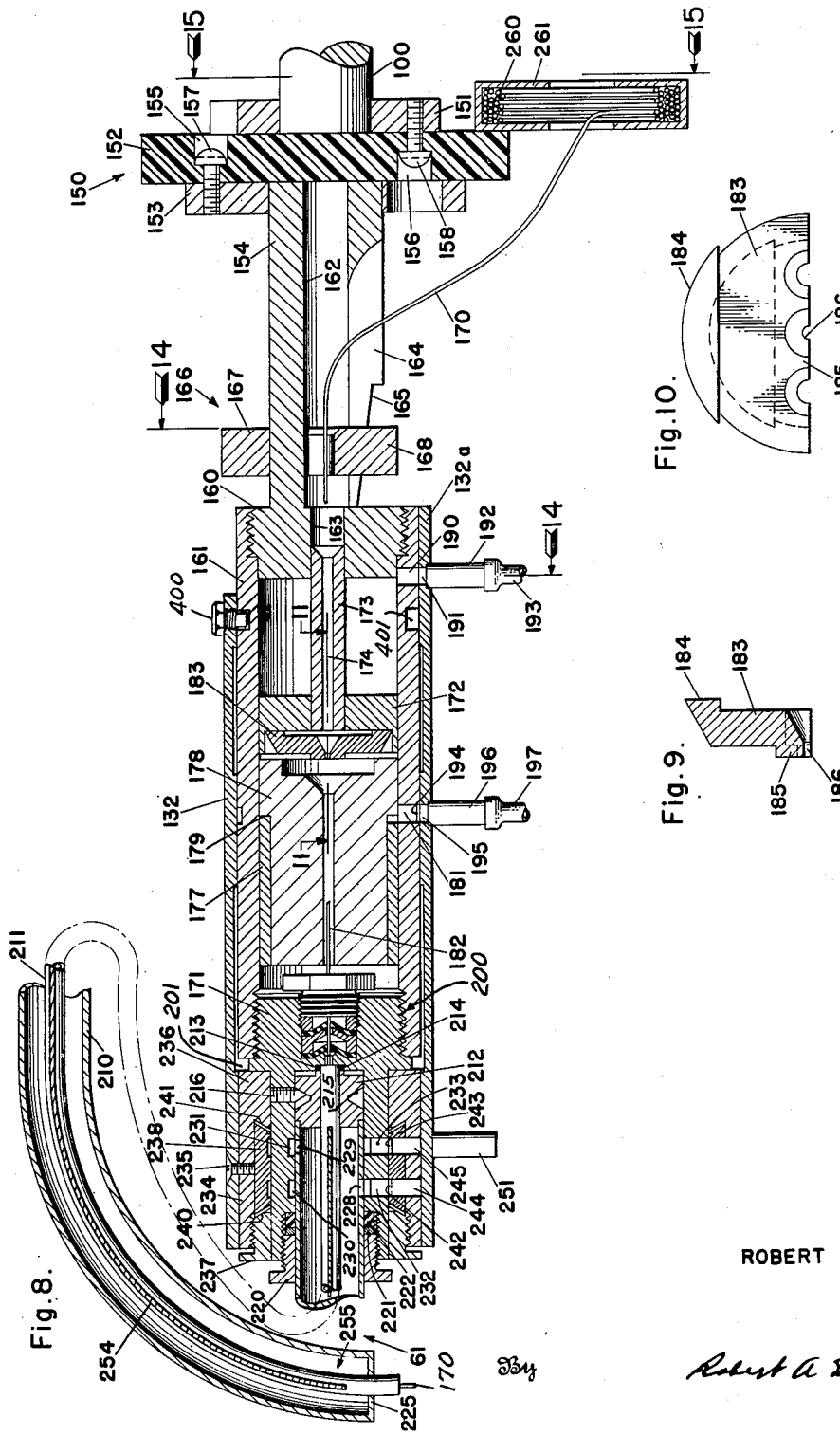

Dec. 30, 1952 R. R. WILSON 2,624,009
ION SOURCES
Filed Dec. 31, 1946 8 Sheets-Sheet 5

Inventor
ROBERT. R. WILSON

By Robert A. Lavender
Attorney

Dec. 30, 1952 R. R. WILSON 2,624,009
ION SOURCES
Filed Dec. 31, 1946 8 Sheets-Sheet 6

Inventor
ROBERT R. WILSON

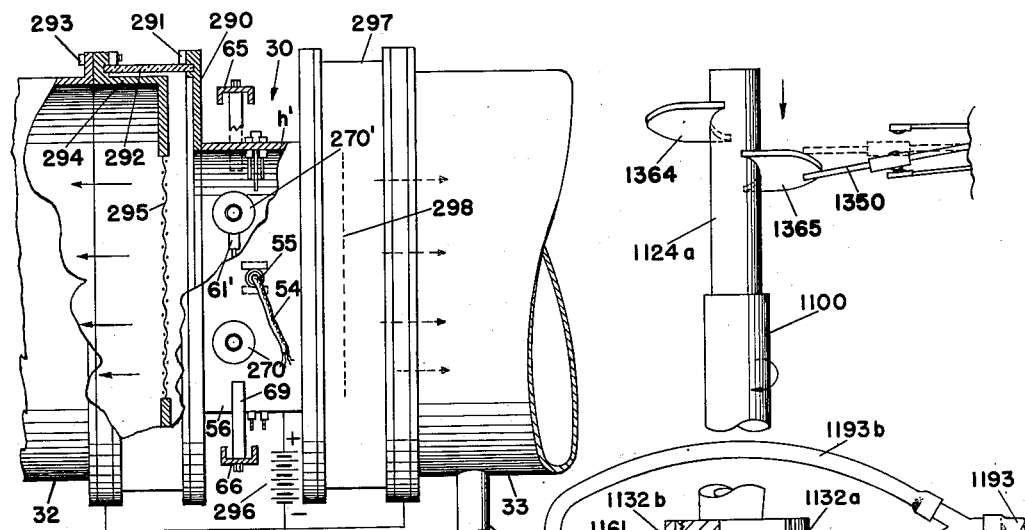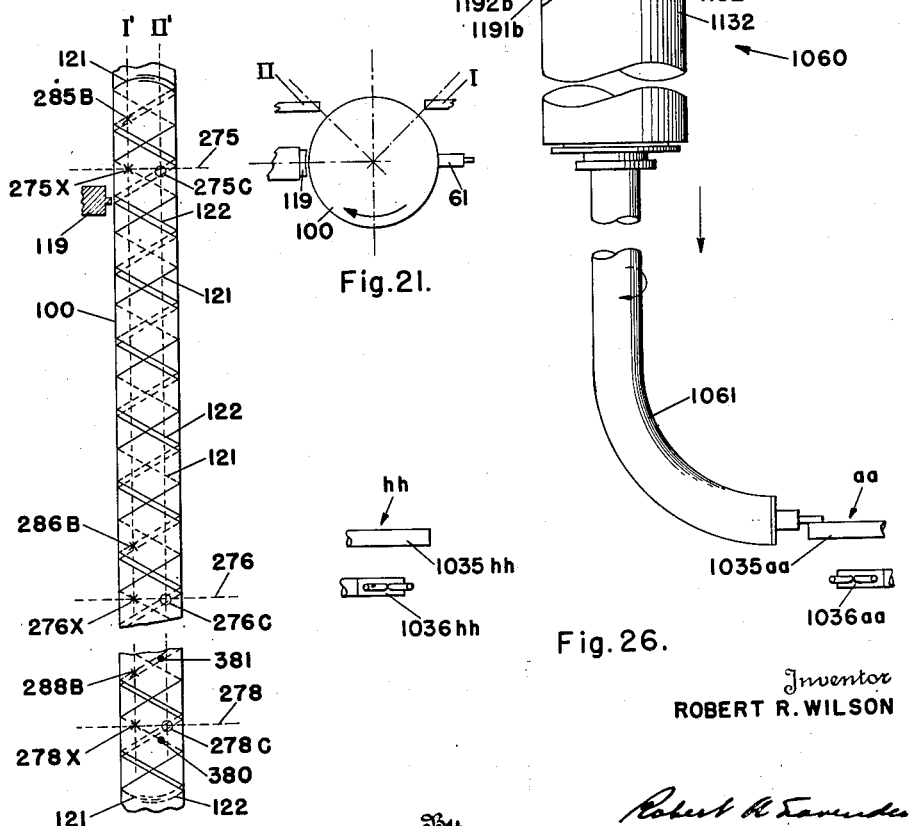

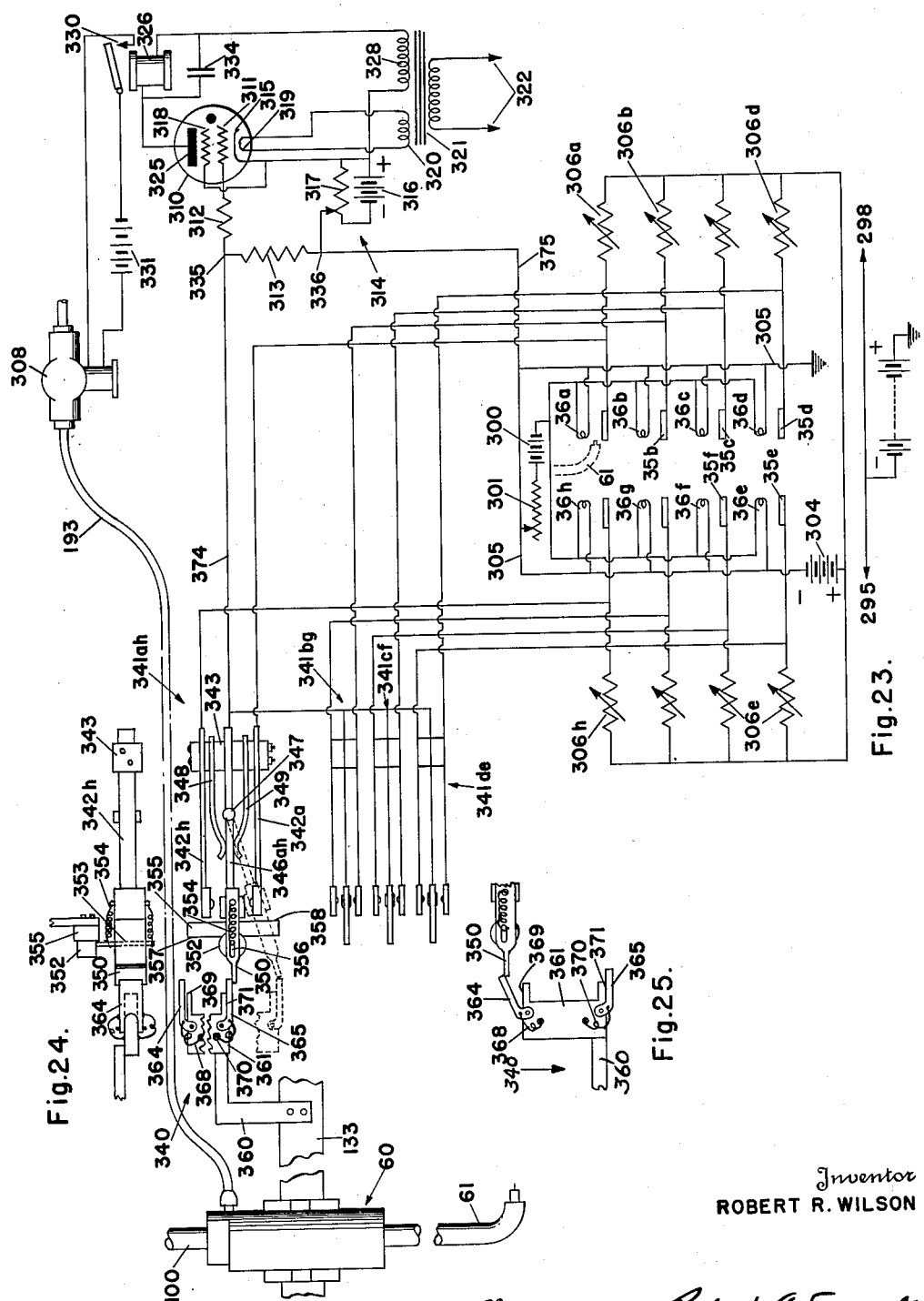

Patented Dec. 30, 1952

2,624,009

UNITED STATES PATENT OFFICE 2,624,009

ION SOURCES

Robert R. Wilson, Cambridge, Mass., assignor to the United States of America as represented by the United States Atomic Energy Commission Application December 31, 1946, Serial No. 719,603

42 Claims. (Cl. 250—41.9)

This invention relates primarily to the quantity production of ions of a material susceptible of ionization, for instance as in apparatus where it is desired to generate and withdraw, continuously or otherwise, a copious supply of gaseous ions of one or more predetermined materials. Ion sources are widely used in mass spectrometers and analogous devices for analyzing or investigating the mass, charge, energy or velocity of ionized particles, and also in atomic bombardment apparatus such as cyclotrons and other accelerating tubes, but peculiar problems arise when very large quantities of ions are required over extended periods of time. An outstanding instance of such requirement is in procedure where ions are to be collected to yield industrially useful quantities of material, as in isotope separating or enriching machines that are sometimes, generically or specifically, called mass spectro-separators, calutrons or isotrons. In the quantity production of ions under vacuum conditions ion sources of the arc discharge type are particularly useful and where a non-gaseous material, such as a metal, is to be ionized it may advantageously be supplied or fed to the ionizing device, i. e. the arc region, in wire, granular or like form. In an important specific aspect the present invention deals particularly with the feeding of material to be ionized to such ion sources.

As intimated above, ionization of a material in quantities on a scale larger than that of laboratory experimentation introduces many practical difficulties and these are particularly severe, for example, in the case of material such as the element uranium. Thus where it is desired, in a mass spectro-separator, to obtain a uranium product at least enriched as to its content of the uranium isotope of atomic mass 235, or to effect a substantial separation of the isotope from $U^{238}$, there is not only the difficulty of operating under high vacuum conditions, complicated by the necessity of providing adequate cooling to limit operative parts to non-destructive temperatures, but the small abundance ratio of $U^{235}$ to $U^{238}$ in natural uranium, viz 1 to 139, requires that unusually large quantities of the natural elements be vaporized and ionized in order to obtain even modest amounts of enriched product. Moreover, the readiness with which an element such as uranium alloys reacts with other substances especially at the high temperatures that must be reached to melt and vaporize the metal in an arc, necessitates extraordinary care to avoid contamination, damage of parts, and other impairment of efficiency.

These considerations tend to place practical limitations on the size of individual arc sources that can be used for ionizing such metals. As explained more fully in the copending patent application of William M. Woodward and Lincoln G. Smith, Serial No. 557,821, filed October 9, 1944, and also in another copending application of the cited inventors, Serial No. 547,918, filed August 3, 1944, special electrode arrangements and arc operating and feeding procedures have been developed (being described and claimed in the cited applications), to avoid various difficulties, including the rapid deterioration likely to occur to electrode structures if used for supporting large amounts of molten uranium in or near an arc discharge. In embodying the improvements of the cited applications, and indeed in other cases, e. g. for other metal-fed sources, it appears to have been advantageous to utilize individual arc devices having modest dimensions and arranged for ready replacement or adjustment of electrodes and other parts wherein wear can not be avoided. It will be understood, of course, that the foregoing problems and requirements are similarly applicable to ion sources for other isotope classifying operations with uranium and similar substances, for instance in second-stage mass spectro-separators where uranium already enriched in $U^{235}$ content is treated for further enrichment, and that in large measure on or more of the problems mentioned hereinabove may be encountered in any isotope or mass separating machine, various features of the procedure and apparatus of the present invention being useful in ion generating apparatus under a wide variety of circumstances and for many different materials to be ionized.

A principal object of the invention is to meet problems of the sort outlined above by providing a plurality of ion sources arranged in juxtaposition, or like composite arrangement of ionizing regions, in a single evacuated space with efficient feeding means arranged to supply material to be ionized to each of the ion sources or components. A further object is to provide apparatus and procedure for generating a large supply of ions by utilizing a plurality of arc discharge devices each of a size and character advantageous for avoiding difficulties such as hereinabove stated, and yet without the complexity of structure and operation that would be incidental to the use of separate feeding arrangements for every one of the several discharge devices.

Other objects are to provide improved, automatic feeding means for supplying ionizable material, for example in wire or like solid form, to an ion source; to provide such feeding means adapted for automatic feeding operation to a plurality of ionizing devices or regions, e. g. in succession; and to provide feeding means of the stated character, that is readily adjustable and controllable, as to timing, disposition and extent of the feeding operation.

Another object of the invention is the provision of an arrangement, for example to supply ionizable material to ion sources in a mass spectro-separator or the like, such that the delivery portion only of the feeding means is within the evacuated space, the nature of the structure and of the relative movements being such that conveniently small and thus relatively simple pressure sealing devices capable of maintaining their gas-tight integrity may be employed.

Still further objects are to provide means for bodily moving the feeding mechanism so that material to be ionized is fed to a plurality of ion sources in accordance with the disposition of the sources; and to provide feeding means, e. g. of the described character, for supplying a plurality of sources pursuant to a predetermined program as automatically modified, if desired, by the individual requirements of the ion sources.

Another object is to provide an improved, reliable and relatively simple mechanism, particularly one of a remotely controllable nature, for engaging and advancing wire or like material to a delivery point.

Other objects and advantages include such as are hereinafter stated, or as are incidental to the use and practice of the several structures and methods of the invention, or as will be otherwise apparent from the following description and accompanying drawings of certain specific embodiments, presently deemed to be advantageous, which are set forth as examples but which will serve illustratively to explain the nature and principles of the invention.

In the drawings:

Fig. 1 is an elevational view of one complete apparatus embodying the present invention in association with an isotope separating machine (on reduced scale relative to other views);

Fig. 2 is a fragmentary side elevation taken from the right-hand side of Fig. 1 and showing a lower part of the supporting frame;

Fig. 8 is a sectional view of one of the feeding units embodied in Fig. 1, the view being taken on what would constitute a vertical plane in Fig. 1;

Figs. 9 and 10 are respectively a section and plan of a wire-gripping element shown in Fig. 8;

Fig. 20 is a horizontal section on line 20—20 of Fig. 1, showing portions of associated ion separating apparatus, and with certain parts broken away;

Figs. 21 and 22 are diagrams in the nature of a plan and vertical elevation respectively, to illustrate the displacement and timing of the feeding unit;

Fig. 23 is a diagrammatic view showing associated electrical instrumentalities and circuits therefor;

Fig. 24 is a plan view of an electrical switch device included in Fig. 23;

Fig. 25 is a fragmentary elevation of the switch device with actuating parts in a different position; and Fig. 26 is an elevational view, with certain parts broken away, of a feeding unit and related ion sources, illustrating a modified embodiment.

Figure 3:
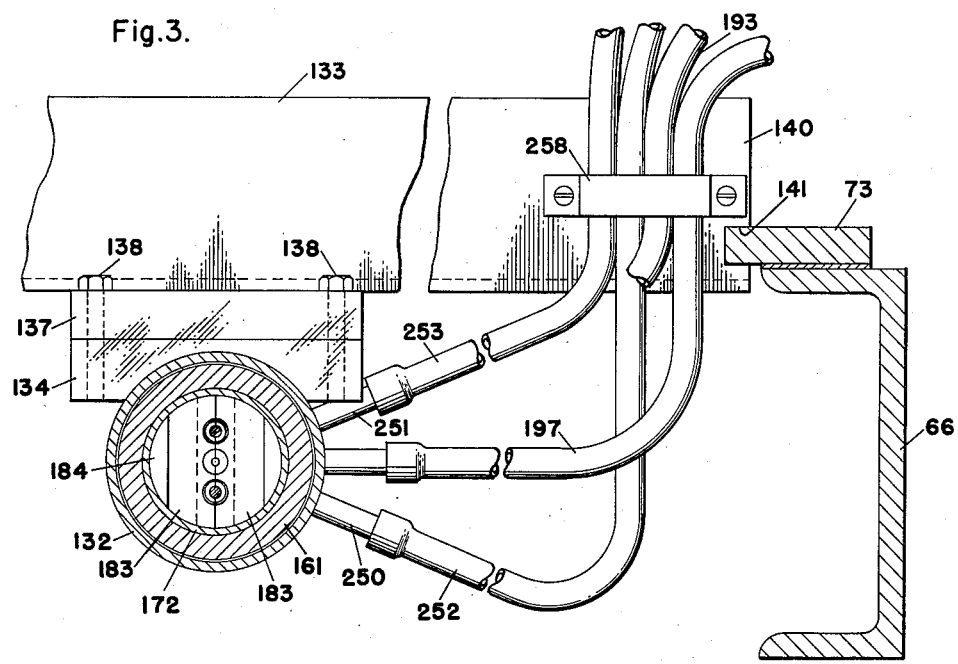
Fig. 3 is a section of a part of Fig. 1 on line 3—3.

Referring first to Figs. 1 and 20 of the drawings the illustrated embodiment of feeding and ion source structure of the invention is shown in association with an ionic-type isotope separating or concentrating device, sometimes also called a mass spectro-separator. In such a device a material of complex constituency, e. g. an element having two or more isotopes, is ionized and the resulting ions are subjected to classifying influences of electrical or magnetic nature or the like so as to yield one or more collected products of enriched composition, for instance in the case of uranium so as to yield, by collection of the ions, a product that is at least substantially enriched with respect to the isotope of mass 235. Although the apparatus and procedure of the present invention are applicable to a wide variety of separating devices, the structure of the drawings is particularly adapted to apparatus wherein a beam of ions is accelerated down a tube, conveniently of cylindrical shape, and first subjected to the effect of one or more electric fields varying, say, at a high radio-frequency in such fashion as to produce more or less of a bunching of the ions in accordance with their masses. The successive bunches of ions then traverse an analyzing means whereby under the influence of further electric fields synchronized with the bunching fields the ions are deflected into suitable collecting receptacles, selectively in accordance with their masses. Since the details of the separating apparatus form no part of the present invention, specific illustration and description thereof are omitted herein but reference is made to the application of Robert R. Wilson, Serial No. 653,518, filed March 11, 1946, now Pat. No. 2,606,291, wherein such apparatus is described and claimed. It will be appreciated that for the collection of substantial quantities of the desired product in apparatus of the character described, a large quantity of ions must be continuously propagated through the tube and to that end the structure here illustrated provides an ion beam of considerable magnitude, advantageously having a large cross-section and a relatively high intensity.

Ion sources

Accordingly there are provided a plurality of ion sources of the arc discharge type, enclosed in a rectangular metal supporting housing 30 having its opposite faces open, the ion sources being disposed in a common plane intermediate the open faces of the housing 30 and parallel to them. Although various numbers of ion sources may be associated in this manner, the illustrated machine includes 16 sources arranged regularly in four columns within the housing 30, and for purposes hereinafter disclosed, considered as constituting two double-column series of eight ion sources each, the individual sources or discharge devices in one series being designated by the letters $a$ to $h$ inclusive as shown on the drawing and those of the other series by the letters $a'$ to $h'$.

As more particularly described below, the source tank section 30 is disposed between the tubes 32, 33 of two ion separating machines of the character described, so that ions generated by both series $a$ to $h$ and $a'$ to $h'$, i. e. the ions from all sixteen arcs, may be withdrawn in opposite directions through the open faces of the source tank section 30 and accelerated down the tubes 32, 33 respectively in the direction of the arrows shown in Fig. 20 for the desired separation and collection. In accordance with usual practice for apparatus of this sort, the source tank or chamber 30 and the communicating isotope separating tubes 32 and 33 are evacuated to a very low pressure, for instance through the pipe 34 connected to suitable vacuum pumping instrumentalities (not shown).

Figure 17:
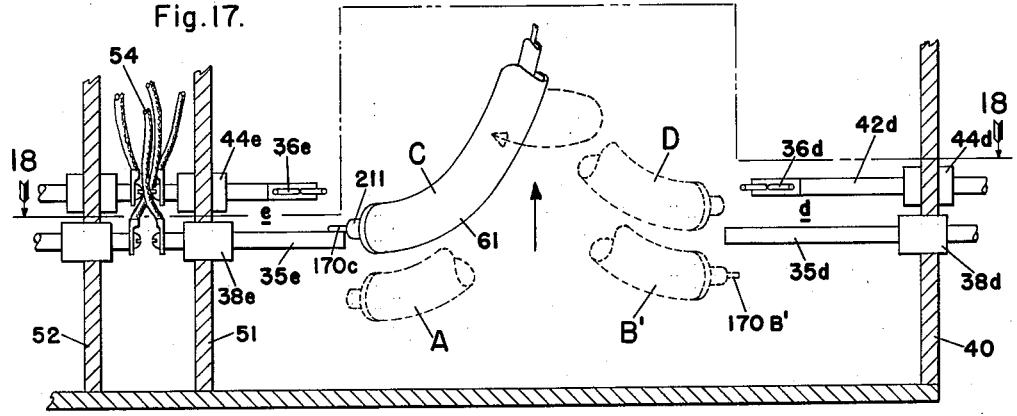
Fig. 17 is a fragmentary view, partly in vertical section and partly in elevation, of certain ion source elements shown in Fig. 1.
Figure 18:
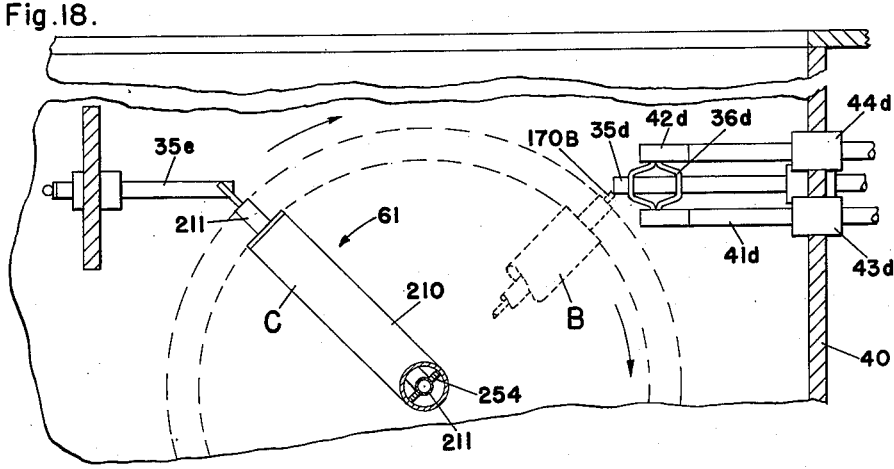
Fig. 18 is a fragmentary horizontal section on line 18—18 of Fig. 17.

Referring also to the enlarged view of the sources $d$ and $e$ in Figs. 17 and 18, each individual discharge device or source comprises a pair of electrodes such as the anode 35$d$ and the cathode 36$d$ of source $d$, the other sources being conveniently identical in these respects and the parts thereof being correspondingly numbered in the drawings. The anode 35$d$ comprises a rod, for example, a ¼ inch rod of a suitable refractory metal such as tungsten, which traverses and is carried by an insulating seal generally designated 38$d$ in the side wall 40 of the source tank 30. Spaced a short distance, say ½ to ¾ inch above the rod 35$d$ near its inner end, the cathode 36$d$ may comprise one or more wires, for instance, two ⅛ inch tungsten wires spread apart as shown and carried at their ends by supporting members 41$d$, 42$d$, which in turn traverse the wall 40 through insulated supporting seals 43$d$, 44$d$. It may be explained that the cathode wires 36$d$ (thus electrically connected in parallel) are heated, as a filament, by the passage of electric current so as to be electron emissive, and an arc is struck between them and the anode 35$d$ by the application of suitable potential therebetween. Electrical connection to the described parts for energization of the filamentary cathode and for initiation and maintenance of the arc may be made through the supporting members 41$d$, 42$d$ and 35$d$.

Ion sources of this general type are disclosed in the applications of Woodward and Smith hereinabove identified and it can now be understood that the individual sources or the electrodes thereof may assume any of a variety of forms and shapes, the illustrated structure being shown for the sake of simplicity and convenience. As more particularly explained in the cited applications, metal to be ionized may be supplied to the surface of the anode 35$d$, where in the heat of the arc such metal melts and vaporizes, so as to be ionized by the arc discharge. As further explained in the cited applications it has been found very desirable, particularly in the case of uranium and like materials, to prevent accumulation of large amounts of the metal in contact with structural parts of the arc under such circumstances that undesirable alloying or reaction might occur. Accordingly the anode, in the form of a rod or platform, is conveniently such as to hold only a limited coating of the metal, which may be intermittently fed thereto, advantageously in wire form in accordance with presently preferred embodiments of the present invention. When the amount of metal on the anode is thus limited, there is very little alloying with the tungsten and thus there is little or no erosion of the tungsten over extended periods of time by virtue of the reduction of melting point which a large extent of alloying would produce. It will be understood the structure shown is readily adapted for replacement or renewal of arc electrodes as may be desired from time to time and indeed the anode 35$d$ may, if desired, be arranged to slide through its supporting seal 38$d$ so that as and if its end is eventually eroded or otherwise destroyed, the rod may be pushed further into the tank, exposing a further portion thereof to serve as anode.

As will be apparent from Fig. 1 the other arc sources $a$, $b$, $c$ of the right-hand column are similarly mounted in the wall 40, and sources $e'$ to $h'$ are likewise mounted in the opposite wall 50 of the source tank. The sources $e$ to $h$ and $a'$ to $d'$ are respectively mounted in a like fashion on upstanding plates or bars 51, 52 secured within the tank near the central portion thereof. The insulating supports 38$e$, 44$e$, and so forth, for the two central columns of sources need not be of the vacuum sealing type in the device illustrated, i. e. where the space between the plates 51, 52, is not closed off from the interior of the tank 30, but the several electrical conductors collectively designated 54 for these arcs are brought out through a suitable insulating seal 55 in the upper wall 56 of the source tank section.

Arrangement and support of feeding devices

In accordance with the present invention, means are provided for feeding ionizable material, e. g. uranium wire, to the several ion sources, and to that end there are provided a pair of wire-advancing mechanisms or feeding units generally designated 60 and 60', having associated rotating wire delivery tubes 61 and 61' and disposed in vertical planes intermediate the source columns $a$—$d$ and $h$—$e$ and the source columns $a'$—$d'$ and $h'$—$e'$ respectively. As described hereinbelow the feed units comprise pneumatically actuated wire-advancing mechanisms, but as a whole reciprocate vertically so that in traveling downward the tube 61 is adapted to supply wire to the sources $a$ to $d$ in succession and the tube 61 is similarly adapted to feed the sources $a'$ to $d'$, while on the upward trip of the delivery tubes, the sources $e$ to $h$ and $e'$ to $h'$ may be supplied. The arrangement is preferably such that as a fresh portion of wire is advanced into a given arc, conveniently on the anode thereof, the desired quantity of wire melts off and is retained on the anode surface for vaporization and use as explained above.

To support the feeding apparatus, and preferably also the source chamber 30, a framework generally designated 63 is provided, carrying a gear box 64 that transmits the desired rotating and reciprocating drive to the feed units 60, 60', which are in turn secured to a vertically movable carriage for displacement up and down together in the frame.

As shown in Fig. 1 the supporting structure 63 includes vertical uprights 65 and 66 which may be made of channel iron or the like, the uprights 65 and 66 being spaced and held together at the top by a crossmember 67 having a portion extending to the right beyond the upright 66 as shown. At the bottom of the uprights 65 and 66 there are adjustably attached thereto short inwardly extending members 68 and 69 which are secured by welding or other suitable means, to the top of the evacuated chamber 30 to support the latter. Each of the uprights 65, 66 is secured to its corresponding one of the short members 68, 69 by a pair of bolts 70 traversing a vertical slot 71 in the upright member and threaded into the end of the short crossmember, as shown in Figs. 2 and 20. Attached by suitable means to the rear faces of the uprights 65 and 66 at a common level are a pair of vertically extending bars or rails 72 and 73 (see Fig. 3), these two members each having a vertical edge extending inwardly from the channel upright members, the purpose of these members being to guide the vertically reciprocating feed mechanism.

The supporting structure 63 and the evacuated chamber 30 are bodily and entirely supported and carried by an overhead trolley arrangement designated generally by the numeral 75. The overhead trolley arrangement includes a yoke 76 having arms 77 and 78 each of which carries a flanged trolley wheel, the trolley wheels being designated by the numerals 79 and 80, and the wheels being journaled on suitable spindles. The arms 77 and 78 are at an angle as shown, adapting the trolley wheels 79 and 80 to ride on the feet of an I beam 81 centrally and longitudinally arranged above the entire apparatus. The yoke 76 supports the structure 63 by means of a screw threaded rod 82 which extends transversely through the connecting portion of the yoke and the ends of which engage in blocks 83 and 84, the blocks 83 and 84 being connected to and supporting the crossmember 67 by means of vertical screw threaded rods 85 and 86 which extend vertically through the blocks, each of the rods 85 and 86 having a pair of nuts therein above the blocks as shown. The yoke 76 is actually comprised of two symmetrical halves as shown, which are held together by a connecting member 89, there being a nut 90 on the rod 82 midway between the two halves of the yoke and spaced from the halves by washers or spacer members as shown so that by turning the nut 90 one way or the other the yoke 76 causes the rod 82 and the supporting blocks 83 and 84 (in which the rod is journaled) to be moved to the right or left relative to the yoke. Thus by adjustment of the nut 90 the entire structure 63 and the evacuated chamber 30 may be shifted transversely to the right or left. By loosening the locknuts on the rods 85 and 86 and moving the other two nuts on these two rods, the entire structure may be universally adjusted in a vertical plane, that is, the framework, with its supported parts, may be shifted upwardly or downwardly or it may be adjusted angularly in a vertical plane so as to bring the uprights 65 and 66 into an exactly vertical position if they are not already so disposed.

In addition, the tank section 30 may be adjusted vertically relative to the framework 63, by loosening the bolts 70 so that they are free to slide up or down in the slots 71, permitting the desired vertical displacement of the tank. To facilitate such adjustment (see Figs. 1 and 2), a bolt 91 is threaded through an end plate 92 at the lower end of each of the uprights 65, 66, and when the bolts 70 are loosened, the members 68, 69 rest on the upper ends of the bolts 91, which can thus be screwed up or down to shift the members 68, 69 and the tank 30, and which can each be secured in place, on completion of adjustment, by a lock nut 93. By the described adjustment, the instantaneous vertical position of the wire delivery tubes 61 and 61' as determined by their actuating mechanisms may be adjusted relative to the ion sources in the chamber 30.

Drive mechanism

At the left of the structure 63 and supported therefrom by a suitable bracket support 94 is an electric motor 95 disposed within a suitable housing. The motor 95 is connected to a gear train within the gear box 64 (mounted on the under side of the crossmember 67) by means of a shaft 97, a clutch 98, and a further shaft 99, the clutch being thus disposed between the motor 45 and the gear train. The clutch may be of conventional type controlled, for example, by manual or remotely operable electrical means, not shown. The mechanism within the gear box 64 is so constructed and arranged as both to rotate and to reciprocate a pair of vertical shafts or columns designated by the numerals 100 and 100'. As will be explained more in detail hereinafter, the columns 100 and 100' respectively constitute driving elements of the two identical material feeding mechanisms 60 and 61' which are constructed and operate in the same manner for feeding wire to their respective groups of ion sources a to h and a' to h'. Since the mechanisms are identical, that on only one side of the central dividing line, e. g. unit 60, need be described in detail.

As was pointed out each of the columns 100 and 100' is both rotated and reciprocated by the motor 95 and the operation whereby this movement causes material to be ionized to be fed to the ion sources will be explained hereinbelow. The details of the manner in which the motor 95 so drives the columns 100 and 100' will now be described.

Figure 5:
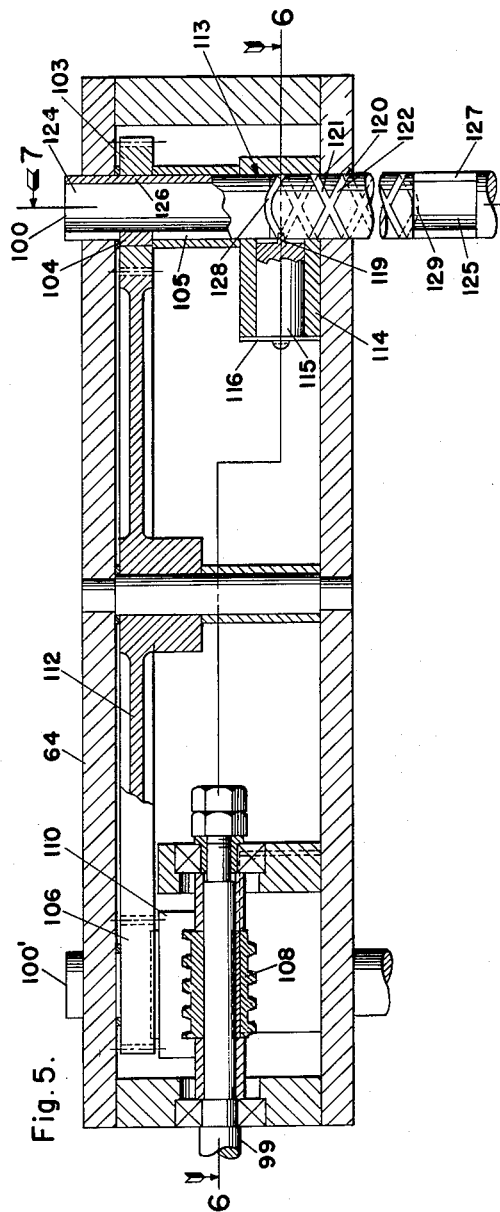
Fig. 5 is a vertical section of the gear box embodied in Fig. 1 for driving the feeding devices (line 5—5 of Fig. 6)
Figure 7:
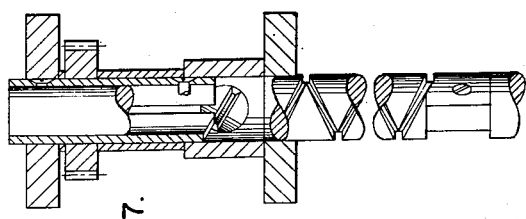
Fig. 7 is a fragmentary vertical section on line 7—7 of Figs. 5 and 6, with certain parts in elevation or broken away.
Figure 6:
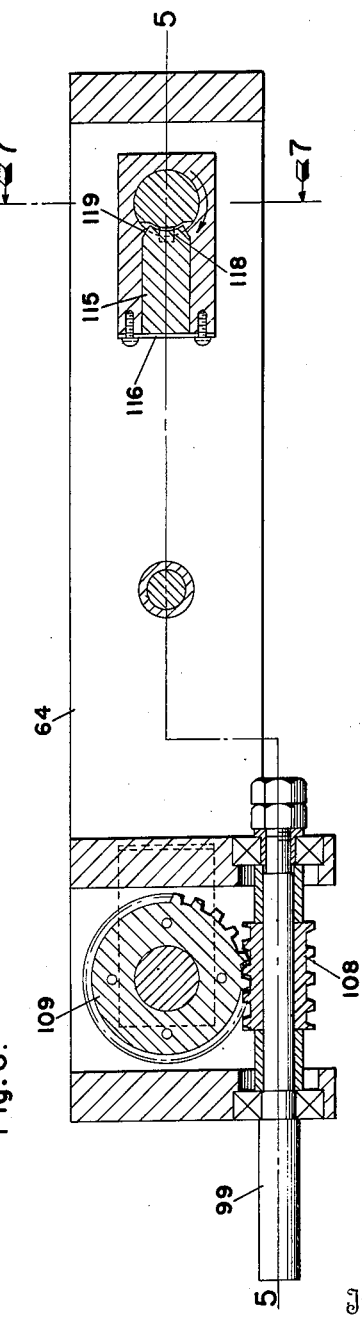
Fig. 6 is a horizontal section on line 6—6 of Fig. 5.

Referring now to Figs. 5, 6 and 7, the column or shaft 100 is suitably journaled in a vertical position within the gear box 64 to permit both rotation and vertical movement thereof. Near the top of the gear box 64 in its right-hand portion (as seen in Figs. 5 and 6) is a gear 103 that is slidably carried on the shaft 100, the gear 103 having a key 104 which engages in a vertical keyway 105 cut in the shaft 100, the arrangement being such that as the gear 103 rotates, the key 104 remains in the keyway 105 while the shaft 100 moves up and down, as will presently be explained. To drive the gear 103, and a similar gear 106 (at the left hand side of Figs. 5 and 6) that is likewise slidably keyed to the shaft 100' for rotation of the latter, the shaft 99 carries a worm 108 that engages a worm gear 109 affixed by an intermediate coupling block 110, to the gear 106. A centrally disposed gear 112, conveniently of large diameter, meshes with both the gears 106 and 103, and it will thus be seen that when the clutch 98 is engaged, power is transmitted from the motor through the train of shaft 97, clutch 98, shaft 99, worm 108, worm gear 109, gear 106, gear 112 and gear 103. Thus the shafts 100 and 100' are rotated in synchronism, at the same speed. Since the remaining structure and mechanism relative to the shaft 100' is identical to that of the shaft 100, the parts of and for the latter will be described, with the understanding that corresponding instrumentalities are provided for the shaft 100'.

The shaft 100 extends through a vertical passage 113 in a housing 114 having a transverse cylindrical recess, which intersects the passage 113 and within which is rotatably fitted a cylindrical member 115, and is thus free to turn about a horizontal axis. The member 115 is secured against axial displacement away from the shaft 100 by a cover plate 116 on the housing 114, and has its end 118 facing the shaft 100 curved in conformity with the surface of the shaft but spaced slightly therefrom so as to clear the shaft when the member turns to a limited extent in either direction as will be hereinafter apparent. The member 115 also carries a key 119 comprising a projection extending across the face 118, substantially along a diameter of the member, and curved as shown so as to engage a groove of a double helical groove or keyway generally designated 120, cut into the shaft 100.

More specifically, the keyway 120 comprises two helices of opposite hand, but conveniently of identical pitch, so arranged that, for example as the shaft 100 rotates in a clockwise direction (as seen in Fig. 6), the right-hand helix 121, by engagement with the key 119, will cause the shaft to travel downward, while the left-hand helix 122, when engaged by the key, will drive the shaft upward. The helically grooved extent of the shaft is sufficient to carry the delivery tube 61 of the feeding unit 60 past all the arcs, e. g. *a* to *d*, in a vertical direction (Fig. 1) and the two helices are connected at both ends in a closed loop. To that end, the shaft 100 has upper and lower portions of reduced diameter 124 and 125 about which are secured respectively a cylindrical sleeve 126 and a semi-cylindrical sleeve 127 abutting the ends of the helically grooved portion and having an outside radius equal to that of the latter. The sleeve-like members 126, 127 have at their facing ends curved notches 128, 129 respectively, each disposed to provide a communicating recessed path between the corresponding ends of the helical grooves, and appropriately shaped as camming surfaces to guide and turn the key 119 from one helical groove to the other, the notch 128 thus guiding the key from helix 121 into the helix 122, and the notch 129 carrying the key back from helix 122 into the helix 121.

It will be understood that the projecting surface of the key 119 either has a sufficiently large radius of curvature or is sufficiently spaced from the bottom of the double helical groove (including the notches 128, 129), and the latter at the same time is sufficiently deep, as to maintain the desired camming and guiding engagement of all parts of the key with the sides of the groove when the key is turned in either direction to ride in the helices 121, 122 respectively, as well as during its period of cross-over in the notches 128, 129. It will also be noted that the vertical keyway 105 may be conveniently machined, like the helical grooves, into the full diameter part of the shaft, and at the upper part may simply comprise a slot or vertical opening in the sleeve 126, disposed as a continuation of the machined part of the groove. Both the key 104, that rotates the shaft, and the key 119, that causes it to rise and fall, have sufficient extent lengthwise of their respective keyways 105 and 120 that neither is deflected from its intended path at the intersections of the groove 105 with either of the groove portions 121, 122, and for like reason, the key 119 traverses the entire length of each of the grooves 121 and 122 without deflection at any of their intersections, i. e. except at the terminal crossover recesses 128, 129.

By the foregoing instrumentalities the shaft 100 is rotated continuously at a uniform speed, and at the same time is moved successively up and down at a steady rate in each direction, the extent of vertical travel being determined by the length of the double helical keyway 120. By identical means, for the most part not shown, the shaft 100' is similarly rotated and reciprocated, conveniently in exact synchronism with the shaft 100.

*Feed unit mounting and carriage*

Figure 4:
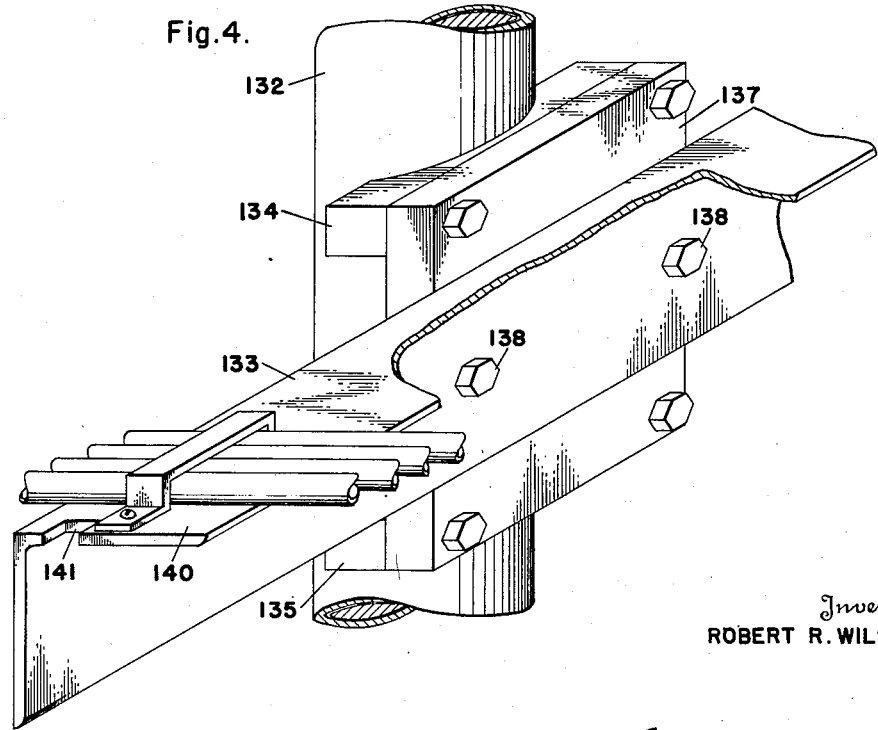
Fig. 4 is a fragmentary perspective view of a transverse member shown in Fig. 3.

The shaft 100 is connected to the feed unit 60 so that the latter is bodily moved up and down, and at the same time certain parts included in the feed unit are also rotated by the shaft. The feed unit 60, however, includes an outer casing or sleeve 132 (see Figs. 1, 3 and 8) that is moved up and down by the shaft 100 but which is constrained from rotating by the feed unit carriage. The carriage comprises a crossmember 133, of angle iron or the like, to which the feed unit 60 is secured by suitable means such as a pair of arcuate-faced supporting members 134, 135 soldered or welded to the outer surface of the sleeve 132 and bolted to the ends of a plate 137 of electrical insulating material that is centrally bolted as at 138 to the vertical face of the crossmember 133 (Figs. 3 and 4). The other feed unit 60' is similarly attached to the crossmember 133 and the upper face 140 of the latter has a notch at each end, such as the notch 141 shown in Figs. 3 and 4, to receive the inner edges of the rails 73 and 72 in sliding relation. Thus the feed units are secured to the carriage with their outer sleeves held against rotation, and the carriage crossmember 133 rising and falling with the units is guided by the rails 73 and 72, it being understood that appropriate means such as counterweights hung over pulleys secured to the framework (not shown) may optionally be provided to relieve the helix-engaging keys and other driving elements, of part or all of the weight of the carriage and feed unit assembly.

Figure 15:
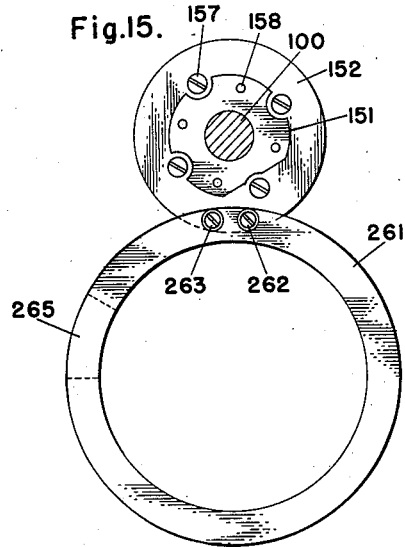
Fig. 15 is a section on line 15—15 of Fig. 8, the view of Fig. 15 being as if rotated 30° counterclockwise in its plane.

As shown in Figs. 1, 8 and 15, the connection between the shaft 100 and the feeding unit 60 includes an insulative coupling 150 that cooperates with the plate 137 in electrically insulating the feeding unit from the driving mechanism. The coupling 150 includes a disc or flange 151 attached to the shaft 100 by soldering or the like, and the disc 151 is faced by a larger disc 152 that is made of insulating material and is in turn faced by another disc or ring 153 attached to the upper end of a shaft portion 154 by soldering or the like. The insulating disc 152, which thus separates the shaft elements 100 and 154, is bored and counter-bored as shown at 155 and 156 so as to receive a plurality of screws 157 and 158 disposed in alternately opposite directions at spaced positions around the disc 152 for fastening the disc 152 to the flanges 153 and 151 respectively, each of the flanges 153 and 151 having suitable openings or notches as shown to accommodate the screws 158 or 157 on their initial insertion to engage the other of the flanges. It will be noted that the lower screw 158 is shown 45° out of position in Fig. 8, whereas actually another screw 157 is disposed diametrically opposite the upper screw 157 and a substantial part of the flange 151 is cut away for purposes described hereinbelow, all as shown in Fig. 15; the displaced composite type of drawing is simply adopted in Fig. 8 to afford clear illustration of both types of screws 157 and 158 and of the manner in which they respectively secure the disc 152 to one of the flanges 153 and 151 while being suficiently countersunk to avoid electrical contact with the other of the flanges in each case.

The shaft portion 100 is directly connected to interior elements of the feeding unit so that such elements are both rotated and reciprocated by the shaft 100. The feeding unit 60 includes, however, and is within the sleeve or casing 132, which reciprocates up and down with the feeding unit but which is constrained from rotating therewith, as explained hereinabove, by the carriage crossmember 133 (Fig. 1). For the sake of clarity the crossmember 133, the parts 134 and the insulating plate 137 are omitted from Fig. 8. The details of the feeding unit 60 will next be described.

*Feed unit: wire-advancing mechanism*

Figure 14:
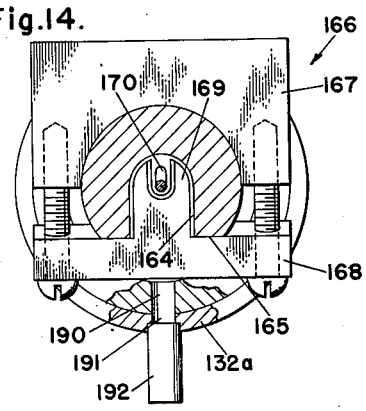
Fig. 14 is a section on line 14—14 of Fig. 8.

Referring now especially to Fig. 8 and also to Figs. 3, and 9 to 14, the shaft portion 154 has an enlarged portion 160 at its left end (as seen in Fig. 8 wherein the feed unit 60 is shown as if turned on its side relative to Fig. 1), constituting a plug that is threaded into and closes the end of a casing or cylinder 161. The shaft portion 154 has an internal bore 162 opening into a bore 163 of slightly smaller diameter within the plug portion 160. The shaft portion 154 also has a longitudinal slot 164 aligned with the axis of the shaft portion, for purposes hereinafter set forth. The under side of the shaft portion 154 also has a flat machined surface 165 disposed at an angle to the axis of the shaft portion. The numeral 166 designates an adjustable stop device for governing the extent of each wire-advancing stroke of the pneumatic feeding mechanism. The device 166 comprises upper and lower members 167, 168, having spaced, opposing faces at the sides, adapting the two members to be clamped to the shaft portion 154 by means of screws extending through the member 168 and into the member 167 as shown in Fig. 14, the upper member 167 having a curved inside surface to fit the upper half of the shaft portion. The lower member 168 has a slanting machined surface adapted to engage the surface 165 of the shaft portion 154, and also has a central upstanding finger 169 adapted to extend upwardly through the slot 164 into the interior of shaft portion 154, this upstanding finger being itself slotted so as to adapt it to receive the wire 170 (see Fig. 8) being fed (along the bore 162) to the ion sources. The device 166 may be adjusted to the right or left along the shaft portion 154 and set in the desire position for arresting the feed stroke as explained below.

The cylinder 161 fits in and rotates within the sleeve 132, the left end of the cylinder 161 being closed by a plug structure designated 171, shown also in Fig. 16 and described in detail hereinbelow.

Within the cylinder 161 is a piston 172 having a skirted portion extending to the left as shown and having a stem 173 extending to the right and fitting into the bore 163 of the plug 160. The stem 173 has a longitudinal bore 174 for passage of the wire 170 that is being fed. The piston 172 may reciprocate to the right and left within the cylinder 161 and is shown in Fig. 8 in its extreme left-hand position. The extent of its travel to the right is determined by the engagement of the stem 173 with the finger 169 of the stop device 166, so that the amount of movement of the piston to the right is thus determinable by the setting of the device 166 on the shaft portion 154.

An internal sleeve 177 is fitted into the cylinder 161 near its left-hand end (Fig. 8), and is attached thereto, as by soldering, and another piston 178 is arranged to reciprocate within the sleeve 177, the piston 178 having a portion at its right end of slightly larger diameter, which fits the internal diameter of cylinder 161 as shown and which provides a leftwardly facing shoulder 179, adapted to abut the right-hand end of the sleeve. In order to provide a small space between at least a part of the sleeve 177 and the shoulder 179 when the piston 178 is in position for abutment of the shoulder against the sleeve, and to provide for fluid, e. g. air, communication into the space between shoulder and sleeve when the piston 178 is moved to the right from the position shown, the right-hand end of the sleeve has a small semi-circular notch 180 (see Fig. 13), opening toward the shoulder 179, and shaped and disposed in fixed and conforming registration with a small circular hole or port 181 in the cylinder 161. The piston 178 has a longitudinal bore 182 with a conical countersink and a relatively large counter-bore at the right-hand end as shown.

Figure 11:
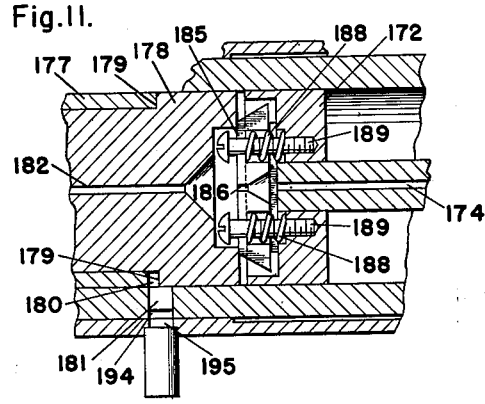
Fig. 11 is a fragmentary section on line 11—11 of Fig. 8.
Figure 12:
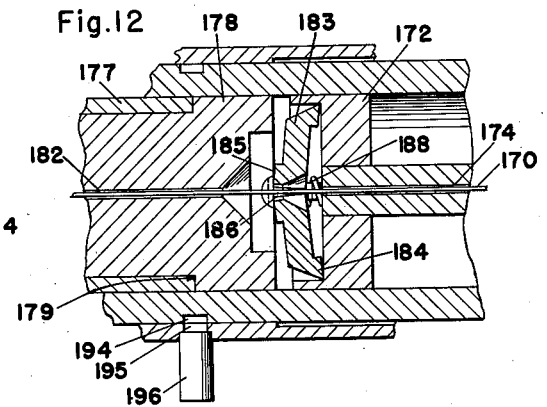
Fig. 12 is a fragmentary section similar to Fig. 8, showing certain central parts thereof in a different position.
Figure 13:
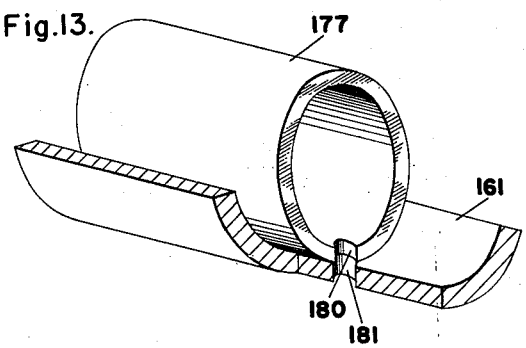
Fig. 13 is a fragmentary perspective view of certain parts shown in Fig. 8.

Disposed in the depression formed by the skirted portion of the piston 172 are a pair of semi-circular elements 183 forming chuck jaws, the two elements together being substantially circular. One of the jaws 183 is shown in detail in Figs. 9 and 10, attention also being directed to Figs. 3, 8, 11 and 12. It will be understood that the section of Figs. 8 and 12 is such that half of each of the two jaws is shown in cross-section as in Fig. 9. The curved side of each chuck jaw 183 is conically tapered, and at the outer edge of its face of greater diameter each jaw has a segmental raised portion 184, these segmental raised portions forming shoes adapted to seat against the face of the piston 172 when the jaws are disposed within the skirt of the piston 172 as shown in Fig. 8. Each of the jaws 183 also has a transverse rib 185 adjoining the straight side of its opposite face and when the jaws are in wire-engaging position as shown in Figs. 8 and 11 these ribs, which are parallel to the flat sides of the shoe portions, abut the right-hand end of the piston 178 at the edges of the counter-bore of the piston. At the center of its straight side and adjacent its ribbed face, each jaw 183 has a small semi-circular notch 186 flaring out to the opposite face, so that when the jaws are in the position of Figs. 3, 8 and 11 with their straight sides in flat abutment, the notches 186 constitute a small central bore conically countersunk from the right-hand faces (as seen in Fig. 8) of the abutting jaws. In this position, the jaws are adapted to grip the wire 170 being fed, it being understood that the path of wire travel is through the passage 174, then between the jaws and on through the passage 182, and that the radius of the semi-circular notches 186 is not larger than the radius of the wire and may indeed be very slightly smaller, e. g. to the extent that deformation of the wire is feasible or permissible.

It will now be seen that the wire-engaging action of the jaws 183 is brought into play when they are compressed between the pistons 172 and 178, i. e. in that pressure of the piston 172 on the shoes 184 and pressure of the piston 178 on the central ribs 185 tend cooperatively to rock the upper jaw 183 counter-clockwise about its uppermost edge (as seen in Fig. 8) as a fulcrum and to rock the lower jaw clockwise in similar fashion, whereby the jaws are cammed or wedged toward or against each other and thus against the wire between them. When the pressure of the pistons is released, as by displacement of the piston 172 to the left away from the piston 178, the jaws are free to swing in the opposite directions, i. e. away from the wire and to a position such as shown in Fig. 12. To promote release of the wire under such conditions, a pair of compressed coil springs 188, 188, are disposed intermediate the jaws 183 and the recessed face of the piston 172, one at either side of the central notches 186 on the parting line of the jaws. The springs are seated in appropriate recesses in the piston face and like recesses in the faces of the jaws, and are retained by guide screws or studs 189 traversing the jaws and threaded into the face of the piston 172 as shown in Figs. 3 and 11, the screw holes and spring-seating recesses in the jaws being split by the parting line of the latter so that on separation of the pistons the jaws can be thrust apart by the springs, to release the wire as shown in Fig. 12, without interference by the screws.

Pressure, e. g. of compressed air, for operating the piston 172 is supplied through a port 190 in the cylinder 161 which at a certain point in the rotation of the cylinder 161 registers with a port 191 in the sleeve 132, the latter port including a nipple tube 192 and being therewith connected by a tube 193 to a source (not shown) of pneumatic pressure say of 35 pounds per square inch. The tube 193 is flexible (see Figs. 1 and 3) as are all the tubes and connections presently to be referred to, so as to accommodate the up and down movement of the feed unit 60. The sleeve 132 is not throughout coextensive in length at its right end with the cylinder 161, but has only a portion 132a of relatively small angular extent, at the bottom as seen in Figs. 8 and 14, so dimensioned, i. e. coextensive with the cylinder 161, the port 191 traversing this extension 132a. Thus as the cylinder 161 rotates, the ports 190 and 191, operating as a rotary or sleeve valve, will be brought into registry permitting admission, if desired, of fluid (e. g. air) under pressure into the cylinder 161 for operating the piston 172; if the piston has been retracted to the right, the fluid under pressure so admitted will move the piston 172 to the left into the position shown in Fig. 8. When continued rotation of the shafts 100 and 154 and the cylinder 161 has carried the port 190 beyond the portion 132a of sleeve 132 that is coextensive in length with cylinder 161, the port 190 is opened to the atmosphere and the pressure acting on piston 172 is released, so that it may move back to the right by the action of the piston 178 as will now be explained.

The port 181 that communicates with the space 180 between the end of sleeve 177 and the shoulder 179 on the piston 178 opens into a peripheral annular groove 194 that extends all the way around the cylinder 161. The groove 194 communicates with a port 195 in the sleeve 132 at all times as the cylinder 161 rotates in the sleeve, and the port 195 has a nipple tube 196 for connection by a flexible tube 197 (Fig. 3) to the source of pneumatic pressure (not shown) so that air or other fluid under pressure is at all times communicated to exert force at least on that part of the shoulder 179 of the piston 178 that faces the notch or recess 180. The piston 178 is therefore continuously urged to the right by pneumatic pressure, the arrangement thus functioning as a pneumatic spring, biasing the jaws 183 and the piston 172 to the right as seen in Fig. 8. Since the maximum effective pushing area of the piston 178 consists of its shoulder 179 and is considerably smaller than the effective area, i. e. the rear face, of the piston 172, it will be seen that the latter piston, when actuated by compressed air through the ports 190 and 191, can overcome the thrust of the piston 178 and force the jaws 183 and piston 178 to the left. It will also be appreciated that the springs 188 exert sufficient pressure to keep the jaws 183 in the open or released position of Fig. 12 when pressure is released from the rear face of the piston 172 and the latter is then traveling free, i. e. is being pushed to the right by the piston 178 acting through the jaws 183 and the springs; but when the piston 172 is positively arrested at the end of its rightward travel or when fluid pressure is exerted on its rear face, the pressure exerted on the shoulder 179 of the piston 178 is sufficient to overcome the force of the springs and thus to shift the jaws 183 into wire-engaging position.

*Feed unit: wire advancing operation*

Let it be assumed, for example, that after a feed stroke the cylinder 161 has rotated from the position of Fig. 8 so that the port 190 is clear of the sleeve portion 132a, and pressure is thus released from the piston 172. The springs 188 then immediately force the jaws 183 open, actually by moving the piston 172 to the right as in Fig. 12, and at the same time the piston 178 commences to move all the parts, viz. the open jaws, the springs and the piston 172 to the right (without moving the wire 170), continuing to do so until the stem 173 of the piston 172 strikes the finger 169 of the stop device 166 and positively arrests the piston 172. The piston 178, however, continues to advance, exerting pressure on the ribs 185 of the jaws 183 and overcoming the pressure of the springs so that the jaws tilt and grip the wire 170 as hereinabove explained. The parts remain in this position until the turning cylinder 161 again brings its port 190 into communication with the port 191, and until at the same time fluid pressure is supplied to the port 191, it being understood that the shaft 100 may make several revolutions between ion sources that require feeding, and that the compressed air supply is appropriately turned off to keep the feed device idle during such period. When feed is desired and the ports are again in registry, the fluid under pressure then introduced moves both the pistons and the jaws rapidly to the left into the position of Fig. 8, the jaws being maintained in closed relation so that the wire 170 is thus advanced into the passage 182 to an extent equal to the length of stroke of the piston 172. The parts are then ready for a repetition of the described cycle, thus to provide an identical advance of the wire 170 when and if desired in a subsequent revolution of the cylinder 161.

From the foregoing it is to be observed that in this embodiment of the invention the device is conditioned for admission of pressure to the piston 172 once during each revolution of the shaft 100, so that there may be one feeding operation at this predetermined point or instant in any selected revolution, and the amount of advance of wire in such feeding operation is determined by the travel of the pistons, which in turn is adjustable by adjusting the position of the stop device 166 on the shaft portion 154. The details of the left-hand portion of the feeding unit 60 and the feeding operation for the plurality of ionizing units will next be described.

*Feed unit: wire seal*

The member 171 as described above engages the left end of cylinder 161 in screw threaded relationship closing it in the manner of a plug. The plug portion of member 171 is designated by numeral 200 and it has a flange 201 that engages the end of the cylinder 161 when member 171 is assembled with the cylinder 161. The member 171 also has a barrel portion 202 extending to the left, as may best be seen in the detail view of Fig. 16. The wire 170 that is being fed to the ion sources is pushed through the member 171 by the above-described advancing means, and after the wire has passed through the plug portion 200 it is in a region that is in direct communication with the interior of the evacuated chamber 30. The member 171 must therefore be provided with very effective sealing means for preventing the leakage of pressure into the evacuated space around the wire as it is being fed. By way of example, and although other types of sliding seal may be used, e. g. such as that disclosed in the above cited application of Woodward and Smith, Serial No. 547,918, one particularly satisfactory form of sealing arrangement is shown incorporated in the member 171 (see Fig. 16) to prevent leakage of air or other gas around the wire 170. The plug portion 200 of member 171 has a tapped hole or bore 203 having a conically convex bottom and adapted to receive the threaded plug 204, the plug 204 and the bottom of the recess 203 having coaxial passages or bores for longitudinal travel of the wire freely therethrough. The sealing means includes two rubber discs, 205 and 206, a conical spacing member 207, and a washer or spacer 208, assembled as shown in Fig. 16. Each of the rubber discs 205 and 206 has a hole punched in its center, the hole being of smaller diameter than the wire 170 so that when the wire passes through the disc the rubber adjacent the wire is necessarily distorted and buckles out of the surface in which it would otherwise lie. The disc 205 is buckled or bent to the right and conforms to the conical bottom surface of the bore 203. The spacer 207 also has a conical surface to which the disc 206 conforms as shown in Fig. 16. All of the elements in the assembly are securely held and clamped together at their peripheries beneath the ring-like washer 208, by turning down on the screw plug 204. From the foregoing it will be observed that the rubber adjacent the wire, for the reasons pointed out above, is urged into intimate sealing contact with the wire and particularly when the wire is moved axially to the left through the plug 204, the bottom of the plug 200 and other elements of the sealing means therebetween, the rubber tends to cling to the wire and seal it against the escape of pressure around it. Furthermore, since the evacuated side of the device is to the left as seen in Figs. 8 and 16, the substantial pressure drop across the seal is in such direction as to urge the rubber discs against the described conical seats and against the wire.

*Wire delivery tube and cooling jacket*

As shown in Fig. 8, the barrel 202 of the member 171 is adapted to receive in close-fitting relationship, the right-hand end (the upper end, in Fig. 1) of the wire delivery tube generally designated 61, which comprises an outer cooling jacket 210 surrounding and radially spaced from a wire feed tube or conduit 211 into and through which the wire may slide freely as it is advanced thereto through the sliding seal just described. It will be noted that the delivery tube structure 61 comprises a straight portion of considerable length extending from the feed unit 60 into the evacuated chamber 30 and terminating with a portion curved through an arc of 90° for actual delivery of wire to the ion sources from the lower end of feed tube 211, the latter tube and its surrounding jacket 210 being of conforming configuration throughout. Attached to the right-hand end (Fig. 8) of the tube or jacket 210, as by soldering, is a cylindrical plug 212 that fits into the barrel 202 of member 171 along with and ahead of the tube 210, the inner feed tube 211 having a projecting portion that fits into a bore of appropriate size in the plug 212. The tube 211 extends entirely through and slightly beyond the plug 212 which has a short sleeve-like projection surrounding the tube 211 at the point where the latter emerges from the plug, the tube 211 being fastened in the plug, as by soldering to the projecting sleeve, and the plug thereby serving to secure and center the right-hand end of the tube 211 with respect to the surrounding jacket 210. The plug 212 also has a short portion of reduced diameter that fits into the adjacent end of the jacket 210, as shown, to enhance the mechanical strength of the soldered or other attachment of the plug to the jacket.

Figure 16:
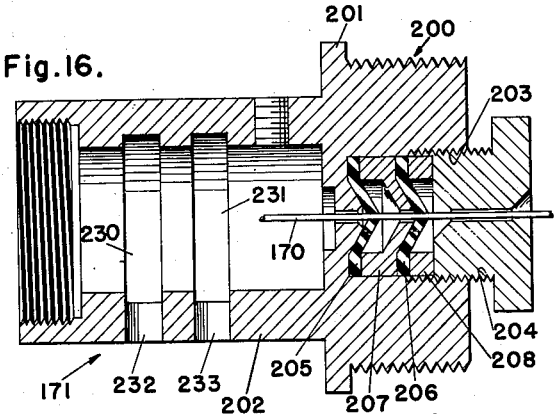
Fig. 16 is an enlarged fragmentary section corresponding to Fig. 8, showing certain elements thereof.

When the parts are in assembled relationship as seen in Fig. 8, the end of the tube 211 projects into a small recess or counter-bore 213 in the member 171 (see Fig. 16). The end of the tube 211 has a rubber gasket or packing ring 214 around it, which fits into the recess 213 and against which the sleeve portion of the plug 212 bears, and is in fact urged, as will presently be described, so that a pressure-tight seal may be formed between the end of the plug and tube assembly 212—211 and the member 171. The plug 212 has an annular groove 215 of V-shaped cross-section extending around it as may be seen in Fig. 8, and there are three screws, one of which may be seen at 216 in Fig. 8, that are spaced at 120° intervals around the barrel 202 and that are threaded into and extend through the barrel and have conical end portions engaging in the groove 215 as may be seen in Fig. 8. Screws 216 are counter-sunk or are preferably of socket-head type so that their heads are flush with or below the outer surface of the barrel 202. From the foregoing it will be observed that by turning down on the screws 216 their conical end portions will exert a wedging action on the groove 215 thus urging the plug 212 and its associated tube 211 to the right so that the projecting sleeve on the plug 212 bears firmly against the gasket 214 around the end of the tube 211, compressing it and forming an effective seal between the members 212 and 171 around the end of the tube 211.

The inside of the barrel 202 of the member 171 is enlarged and threaded to receive a packing nut or bushing 220 through which the tube 210 passes. The inner end of the packing nut 220 bears against a washer 221 and a rubber gasket or packing ring 222 disposed at the bottom of the enlarged bore portion at the end of barrel 202 so that when the packing nut is turned down the gasket 222 is compressed tightly around the tube 210 and against the adjacent shoulder in the barrel, to provide an effective seal between the tube and the barrel. The packing gland thus formed by the packing nut 220 is for the prevention of the space of cooling medium that is utilized within the tube 210 for cooling purposes, particularly to cool the feeding tube 211 as it passes the columns of arcs within the evacuated chamber 30. At its outer or lower extremity, the jacket or tube 210 is closed by a disc 225 in which the tube 211 is secured to project a short distance therethrough as shown, whereby the tube 211 is enclosed practically throughout its length by a jacket adapted to receive a suitable coolant such as water or oil, and is rigidly centered and held in the jacket 210, at its lower end as well as by the plug 212 at the inner or upper end. It will be understood, of course, that the parts of the feeding unit 60 which have so far been described in detail, with the exception of sleeve 132, rotate with the shaft 100. The details of certain parts that do not rotate and of the porting arrangement whereby cooling medium may be continuously admitted from the non-rotating parts to the rotating parts and out again from the rotating parts to the non-rotating parts will now be described.

*Coolant supply means for cooling jacket*

In its portion within the barrel 202, the jacket 210 has two oppositely disposed ports 228, 229, spaced lengthwise of the tube, and in registration with these ports respectively, the inside wall of the barrel 202 has two annular grooves 230, 231 (as shown in Figs. 8 and 16) into which open a pair of ports 232, 233 through the barrel, so that fluid communication may be had into the lower side of the jacket 210 through port 232, groove 230 and port 228 and into the upper side of the jacket through port 233, groove 231 and port 229, regardless of the angular position in which the delivery tube (including the jacket) may be fixed relative to the member 171. Although for clarity of illustration the ports 232, 233 are shown with their axes in the plane of Fig. 8, they may if desired be spaced angularly from each other, for instance with the port 233 disposed 22.5° below and the port 232 disposed 22.5° above the drawing plane.

A sleeve 234 is secured, e. g. by soldering and by a counter-sunk screw 235, within the left-hand portion of the non-rotating sleeve 132, the sleeve 234 having its right-hand portion 236 of reduced internal diameter to fit the barrel 202 and to abut endwise the flange 201 of the member 171. The inside of the opposite end of the sleeve 234 is slightly enlarged and is threaded to receive a packing nut or bushing 237 that also fits over the barrel 202. An inner sleeve 238 is disposed around the barrel 202 within the sleeve 234 and between the reduced-diameter portion 236 of the latter and the packing nut 237. The ends of the inner sleeve 238 are conveniently tapered toward each other and toward the axis, i. e. each having the shape of an inwardly turned frustum of a cone, and the respectively facing end of the nut 237, and shoulder of the reduced-diameter portion 236 have conforming tapers so that annular rubber gaskets or packing rings 240, 241 may be disposed at the ends of the sleeve 238, and upon turning down the packing nut 237, are compressed angularly into sealing relationship with the outside surface of the barrel 202. The sleeve 238 is somewhat longer than the portion of the barrel wherein the ports 232, 233 are located, and a pair of annular grooves 242, 243, are cut in the inside surface of the sleeve for continuous registration with the ports 232, 233 respectively, as the barrel 202 rotates. It will be understood that relative to the rotation of the barrel 202 of the delivery tube 61 and of the feed mechanism contained in the cylinder 161, the sleeves 234 and 238, the nut 237 and the gaskets 240 and 241 are stationary, i. e. non-rotating, with the outer sleeve 132.

A pair of ports 244, 245 respectively opening into the grooves 242, 243, traverse the sleeves 238, 234 and 132 (which are secured together as described above) and also communicate respectively with nipple tubes 250, 251 secured in the sleeve 132 to receive the ends of flexible tubes or conduits 252, 253 (see also Fig. 3) whereby cooling fluid may be advanced to and discharged from the described assembly. Although for simplicity illustrated as if both were disposed in the plane of Fig. 8, as indeed they may be, if desired, the ports 244, 245 (and associated tubes) are advantageously located with their axes angularly spaced from each other, for example with the port 244 and the tube 250 disposed 22.5° above and the port 245 and the tube 251 disposed 22.5° below the drawing plane, in the manner indicated in Fig. 3. While in some cases it may suffice simply to rely on thermal circulation, turbulence of injection, convection or the like to provide sufficient circulation of coolant through the length of the jacket 210, the latter may advantageously have a longitudinal partition 254 composed of co-planar sections on either side of the wire feed tube 211 (see also Fig. 18), disposed perpendicularly to the plane of Fig. 8 and extending from the plug 212 to a point 255 a short distance from the end closure 225.

It will now be seen that a suitable cooling medium such as water, oil, or other appropriate fluid may be continuously supplied, preferably by pumping means not shown, to one of the flexible conduits, for example the tube 252, and that the coolant will thus be introduced through nipple 250, port 244, groove 242, port 232, groove 230 and port 228, into the lower partitioned half of the jacket 210 as seen in Fig. 8. The cooling medium then flows the length of the jacket to the closure 225, where it passes around the end of the partition 254 and returns along the upper half of the jacket, for discharge through port 229, groove 231, port 233, groove 243, port 245 and nipple 251 into the discharge conduit 253. Thus a desirable circulation of coolant is provided along the wire feed tube 211, conveniently sufficient to prevent damage to the tube and jacket and especially to prevent melting, softening or other unwanted derangement of the wire 170 inside the tube, such as might be occasioned by the intense heat of the arcs in the tank 30 particularly at the extremity of the delivery tube that comes into closest proximity with the arcs.

It will be noted that the grooves 242, 243 are particularly useful in maintaining continuous communication for inlet and discharge of coolant as the delivery tube 61 and member 171 rotate relative to the shell 132, while escape of coolant is prevented by the sealing arrangement including the gaskets 240 and 241. It will be understood that the engagement of the shell or sleeve 132 and the last mentioned sealing arrangement with the parts rotating therein will ordinarily be sufficient to prevent undesired axial displacement of the rotating parts, i. e. to the right as seen in Fig. 8, relative to the non-rotating members, but if not, suitable means such as a groove 401 in cylinder 601 and a bolt 400 threaded through sleeve 132 with an extended end projecting in groove 401, may be employed for such purpose. As stated above, the grooves 230 and 231 in the barrel 202 insure coolant communication with the ports 228 and 229 of the delivery tube, regardless of the angular position in which the latter is set. It will be appreciated that with the non-rotating parts removed, the angular position of the tube 61, and thus the direction in which its curved extremity projects relative to the point in the course of rotation where the ports 190 and 191 register for a feed stroke may be adjusted by loosening the nut 229 and the screws 216, turning the tube and its attached plug 212 to the desired position and then retightening the nut and screws. Indeed in the embodiment shown in Figs. 1 to 25, the delivery tube is preferably secured in a position turned about 50° counterclockwise (as seen from the right-hand end of Fig. 8) from the position in which it is shown, for clarity of illustration, in Fig. 8.

Air conduits

The flexible conduits 193, 197, 252 and 253 extending from the feed unit 60 can be secured to the crossmember 133 by an appropriate strap member 258 as shown in Figs. 3 and 4 and thence may pass to an upper part of the framework 63, where they may be similarly secured, as at 259 on the upper member 67 (Fig. 1), en route to their corresponding fluid supply or discharge localities. By reason of the flexibility of the conduits, the latter may bend between the points 258 and 259 as necessary to accommodate the vertical travel of the feed unit.

Wire reel and supplemental structure

Referring to Figs. 1, 8 and 15, for supply of the wire 170 to the feed unit, a coil 260 of the wire may be retained in a shallow cylindrical reel box 261 secured to the insulating disc 152 by screws 262 accessible through holes 263 in the upper surface of the box. The box 261 is open throughout the center portion of its upper and lower faces, and thus consists essentially of an annulus having an inwardly open, channel configuration, a part of the lower (or left hand, as seen in Fig. 8) surface being cut away as at 265 in Fig. 15, for ready withdrawal of wire. Although other reel structures may be utilized, the simple arrangement shown serves satisfactorily for wire of a variety of materials, e. g. 30 mil uranium wire, having sufficient stiffness so that a coil of it will retain itself in the annular channel simply upon being sprung into such position. The reel box, being mounted on the disc 152, is carried around with the rotation of the shaft 100, so that the wire 170 is always aligned for feed into the groove 164 and central bore 162 of the member 154. From the bore 162 the wire threads through the passage 174, between the jaws 183, then through the passage 182, the sliding seal in the member 171 and into the feed tube 211. Once each revolution of the shaft the ports 190 and 191 are in registry; and if compressed air is then supplied, the jaws 183 advance the wire a predetermined extent, so that a correspondingly greater length of wire protrudes from the outer or lower end of the delivery tube, and the jaws are then retracted (by the piston 178) to their right-hand position, gripping the wire in readiness for the succeeding feed stroke.

As indicated in Figs. 1 and 20, the delivery tubes 61 and 61' enter the source tank section 30 through insulating sliding seals 270 and 270', which are not shown in detail but which, as will now be understood, may each comprise appropriate sliding seal structure, for instance of one or another of the types hereinabove described or identified, mounted with a suitable insulating bushing or flange, or supported by and within a heat-resistant insulating tube similar to the insulating cylinders hereinbelow described in the attachment of the tank 30 to the isotope classifying tubes. By this and other means now disclosed the feeding units, with their supply reels of wire, are effectively insulated from all other parts (the flexible conduits 193, 197, 252 and 253 being of electrical insulating material), and especially from the tank 30 and the several arc electrodes therein, thereby reducing the possibility of accidental short circuits and avoiding the initiation of any arc or other discharge between the delivery tube and any of the ion source electrodes. As already stated, the feed unit 60' and its auxiliary parts are identical with the unit 60 and its parts, and operate in exactly the same fashion, so that further description of the unit 60', and for clarity, illustration of certain of its auxiliaries such as its flexible conduits and its control circuit, are omitted.

Feed unit operation and timing

Figure 19:
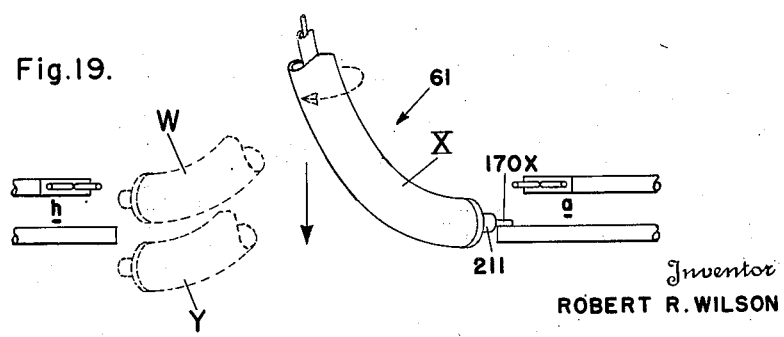
Fig. 19 is a fragmentary view similar to Fig. 17 and corresponding to another portion of Fig. 1, with certain parts in a different relation.

Referring now to Figs. 17, 18 and 19, and also again to Figs. 5, 6 and 7, it will be appreciated that as the shaft 100 turns and rises or falls, the lower end of the delivery tube 61 describes a helical path, sweeping past the column of arcs $a$—$b$—$c$—$d$ at one point in each cycle of the path, and past the column of arcs $e$—$f$—$g$—$h$ at another point in each such cycle. Although other dispositions of these columns may be employed, one convenient arrangement is shown in Figs. 1, and 17 to 19, for arc structures of the sort adopted by way of example herein, and where the arcs are equally spaced in horizontal and vertical directions, for instance separated by a distance of 6 inches between centers of their discharges, in each direction. In this arrangement the delivery tube passes at one side of the column, equidistant from them and so placed, for instance, that lines between the arc centers to the axis of the delivery tube make an angle of about 80°. Further by way of example, let it be assumed that the delivery tube is rotating in a clockwise direction as seen from above and as indicated by the arrows, and that the pitch of the helical groove 120 is such that the tube rises or falls one inch per revolution.

In Figs. 17 and 18, the tube 61 has just commenced its upward travel and has advanced to the dotted line position A (Fig. 17) where the projecting feed tube 211 is, so to speak, one turn below the anode 35e of the ion source e, e. g. one inch below the upper surface of the anode 35e. Further rotation carries the tube to position B (Fig. 18), where by reason of the relation of the tube to the sleeve valve 190—191 (Fig. 8) in the feed unit, and by appropriate control of the compressed air supply to the conduit 193, a feeding stroke is then advancing the wire 170, so that a portion of the latter begins to protrude from the end of the tube 211, as at 170B, position B' (Fig. 17) being that of the tube a few degrees further around, where the desired feed length of wire has been fully advanced (170B'). It will be noted that on this up-stroke the tube 211 at B has not traveled very far from position A and is thus spaced substantially below arc structure d, so that the protruding wire is substantially unaffected by the heat of that arc. The delivery tube then rotates through the remainder of this revolution, e. g. somewhat more than 270° to the solid-line position C (corresponding to original position A), where the feed tube has risen sufficiently to project the wire 170C into the arc e, conveniently just on the anode 35e. Here the protruding length of wire, or at least a desired portion of it, immediately melts into the arc, replenishing the molten layer on the surface of the anode for vaporization and ionization as explained hereinabove. Finally, further rotation carries the tube on to position D (Fig. 17) where the feed tube again passes close to the arc d, but contact with either of the arc electrodes is here preferably avoided, and furthermore, no compressed air is supplied to the conduit 193 when the sleeve valve operates at this point, so that no wire is advanced and thus none melted into the arc d.

It will now be understood that after a number of intervening revolutions without wire advance, the delivery tube passes through corresponding positions, and like wire feed is effected if needed, for supply of wire to the next higher source, f, in the left-hand column (see Fig. 1), and thereafter like cycles are carried out for feed to arcs g and h. Thereupon the tube, continuing to rotate uniformly in the same direction, commences to fall, but by reason of the relationship of the keyway grooves 121, 122 and the cross-over recess 129, traverses a helical path axially displaced from its upward helical path to an extent appropriate for feeding wire to the anodes of the right-hand column of arcs a—b—c—d. Thus for instance, assume that the delivery tube has turned and dropped to the dotted line position W of Fig. 19, where the feed tube 211 is passing the arc h, and where as in position D of Fig. 17, no wire protrudes to be affected by or to affect the arc. As the tube then turns on to the full line position X, compressed air is supplied to the conduit 193 during the operation of the sleeve valve 190—191 (Fig. 8); hence a desired length of wire 170X is fed directly on the anode 35a of the source a, where it or the desired portion of it melts off for use. The tube continues to turn around and down, passing below arc h at position Y, and after an appropriate number of non-feeding revolutions, repeats the described cycle to feed arc b (see Fig. 1). In succession, arcs c and d can be similarly fed, whereupon the tube commences to rise again, undergoing a further axial modification of its helical path, so as to repeat the previously described operations for feeding the arcs e—f—g—h.

The sequence of the foregoing operations and the positional relation of the helical up and down paths of the delivery tube are further illustrated in Figs. 21 and 22. Fig. 21 is a diagrammatic plan of the feed structure, showing the columns of arcs a—b—c—d, designated I, and e—f—g—h, designated II, as well as the delivery tube 61, the helically grooved shaft 100 and the key 119 engaging the latter. Fig. 22 diagrammatically depicts the grooved shaft 100, whereon the groove 121 providing downward motion is shown by a single line so designated, and the groove 122 providing upward motion is shown by a double line so marked. The dotted lines I' and II' represent respectively the points of the shaft, on the rear side thereof as seen in Fig. 22 (and Fig. 5), which are adjacent the key 119 when the delivery tube is passing the arc columns correspondingly designated in Fig. 21. Positions of the key in the groove when wire is advanced by the piston 172 are marked with a cross, and corresponding positions of the key when wire is actually deposited in an arc are marked with a small circle.

It should now be readily apparent how on the upward travel of the shaft the feed tube 211 sweeps the upper surface of each anode of the arcs e—f—g—h, and on its downward travel, the tube sweeps the upper surface of the anodes of the other column of arcs, a—b—c—d. For instance, the horizontal line 275 marks the level of the shaft that is opposite the key 119 when the feed tube is at the level of the anodes of arcs d and e; as the shaft is falling (groove 121), this level is reached when the key passes the line I' at the point 275X (cf. Fig. 19), i. e. when the feed tube is passing the arc d, and as the shaft rises (groove 122), the same level is reached when the key passes the line II' at the point 275C (see Figs. 17 and 18). Like conditions prevail at the other arc levels: thus the line 276 and similarly identified points 276C and 276X on the grooves 122 and 121 respectively correspond to the anode levels of arcs f and c; line 278, and points 278C and 278X correspond to the anodes of arcs h and a; and similar positions, not shown, would correspond to the arcs g and b. Whereas on the downstroke the wire is simultaneously advanced and deposited at the key positions 275X, 276X and so forth, on the upstroke the actual advance of wire, which in this embodiment must take place in either stroke as the delivery tube is passing column I (Fig. 21), occurs at one or another of the key positions 285B, 286B and so forth, where the feed tube 211 is well below (see Figs. 17 and 18) the arc in column I opposite to the one in column II that is about to be fed.

*Means for withdrawing ions from sources*

Referring again to Fig. 20, the gang-type ion source of the present invention is illustratively incorporated in isotope classifying apparatus of the bunch-forming type described hereinabove, indeed actually in two such separating machines arranged back to back with the source structure sandwiched between them so that the same arcs supply ions simultaneously to both tubes 32 and 33 of the respective separators. For connection with the tube 32, which for example may have a diameter of 36 inches to handle the ion beam from a battery of 16 arcs spaced on 6 inch centers, the tank 30 carries a flange 290 having a circular periphery where it is clamped by appropriate means 291 to one end of a cylinder 292 of glass, porcelain or the like. The other end of the cylinder is similarly clamped to an end of the tube 32 by suitable means 293, from which a sleeve 294 extends inwardly of the cylinder 292 and is spaced therefrom, to support an accelerating screen 295 in front of the ion source section. Each of the clamping means 291, 293, includes suitable pressure-sealing gasket structure. Thus the tube 32 and screen 295 are insulated from the tank section 30, and a high negative potential, e. g. from 5,000 to 25,000 volts depending on the characteristics of the isotope separating apparatus, may be applied from a suitable source illustrated by the battery 296, to the tube, and thus to the screen 295, it being understood that the positive side of the voltage supply 296 is connected to the ion sources, or conveniently to the tank 30 if one side of each source, such as the cathode, is grounded to the tank. By these instrumentalities, the strong field between the screen and all of the ion sources withdraws ions from the latter, the metallic ions being positive, and accelerates them to and through the screen so that they are projected as a large beam of relatively high velocity, down the tube 32 in the direction of the arrows, for operation of the bunching, analyzing or other classifying devices, not shown. It will be understood that the described accelerating structure is shown simply for the purpose of illustrating the continuous withdrawal of ions for use, and that other ion accelerating, beam-forming or focussing arrangements may be employed as desired, in accordance with principles known or developed in the art. In the depicted apparatus, the other separator tube 33 is similarly connected to the tank 30 by a like insulator 297 and has a like accelerating screen 298 facing the opposite side of the arc devices, to withdraw ions from the latter down the tube 33; thus the ion source assembly is arranged for the removal of ions in two opposite directions, whereby two separating devices are continuously supplied.

*Control of feeding operation: principles*

Although each of the feeding units 60, 60' is adapted to feed all of the arcs of its series $a$ to $h$ or $a'$ to $h'$ in succession, the operation may advantageously be such that on traversal by the delivery tube each arc is only supplied with wire if further supply is actually needed. For example if an arc of the type and size herein disclosed for illustration will handle a charge of uranium metal sufficient to operate and supply uranium ions for a period of five to ten minutes, as has been found in the case of a number of arcs of this general size and type, and if the feeding unit 60 completes a full cycle of operation past all eight of its arcs in five minutes, it is likely that some but not all of them will need loading in each such cycle. Exhaustion of the supply of metal to be ionized on the anode of an arc source of this type may be indicated by a definite rise in voltage drop across the arc, in accordance with the discoveries set forth in the Woodward and Smith applications hereinabove cited. While control of the operation of the feeding units may be manual, for instance by an attendant who operates a manual valve (not shown) in the air line 193 at the proper times in accordance with observations of the voltages across the individual arcs, or even in accordance with visual observations of the arc anodes (as through suitable windows, not shown, in the tank section 30), a further feature of the invention embraces automatic control by an electric signal from the arc about to be loaded, for example so as to operate a solenoid valve in the compressed air line to the wire-advancing piston 172.

*Arc-energizing and compressed air control circuits*

To that end any of a variety of specific instrumentalities may be employed, and purely by way of example one circuit arrangement, simplified for purposes of convenient illustration, is shown in Figs. 23 to 25, including energizing circuits for the ion sources as well as control means for the feeding apparatus. In Fig. 23, which is related for example to the feed unit 60 and its arcs, the latter are diagrammatically indicated at $a$ to $h$, with their anodes and filamentary cathodes designated as in other figures of the drawings. The cathodes 36a to 36h are all connected in parallel across a source of current 300 in series with a current-controlling variable resistor 301, so that the filaments can be heated to and maintained at the desired temperature for electron emission. A source of arc voltage and current 304 is connected to one side 305 of the cathode circuit and to the several arc anodes in parallel but through impedances such as the ballast resistors 306a to 306h inclusive, conveniently of adjustable nature, individually connected in series with the corresponding arcs. Thus each arc draws current through its own ballast resistor from the source 304, and the voltage drop between anode and cathode of any given arc may be observed independently of the others.

For control of wire advance by the feed unit 60, its compressed air conduit 193 may extend, beyond the point 259 in Fig. 1, through a solenoid valve diagrammatically shown at 308 to a source (not shown) of air under pressure, say of 35 pounds per square inch, the solenoid valve being of a known type conveniently such as to keep the air line closed, and to open the latter only upon and during appropriate energization of its solenoid. Although any of a variety of electron discharge devices of the high vacuum or gas type, or other voltage-responsive devices or circuits may be employed for effecting actuation of the solenoid valve in response to arc voltage conditions, for purposes of illustration Fig. 23 shows a simplified arrangement embodying a thyratron tube 310, i. e. a grid-controlled gas tube, conveniently of a character adapted for reliable operation with a high resistance input circuit, such as a gas tetrode of the type known as RCA-2050. In the circuit shown the first grid 311 is used as the control grid and is connected through a current limiting resistor 312, an input shunting resistor 313 and an adjustable negative bias supply 314, to the cathode 315, the bias supply 314 consisting of a battery 316 shunted by a resistor device 317 of the so-called potentiometer or voltage dividing type having a variable output tap. The resistances 312, 313 may have a value suitable for desired sensitivity and reliability of the circuit, each being for instance of the order of several hundred thousand ohms or more. The second or screen grid 318 of the tube may be connected to the cathode, 315, and the cathode heater 319 may be energized by a secondary 320 of a transformer 321 supplied by an A. C. line 322.

The anode or plate 325 of the tube 310 is connected through the winding of a relay 326 and another secondary 328 of the transformer 321, to the cathode 315, the secondary 328 being adapted to provide suitable alternating E. M. F. in the anode circuit whereby the tube will fire in response to appropriate change of grid bias and the anode current will thereupon energize the relay 326, and whereby upon restoration of cutoff bias the tube discharge will be interrupted on the next negative half cycle of the A. C. supply. The relay 326 has a pair of normally open contacts 330, connected in series with a source of current 331 and the winding of the solenoid valve 308 as shown, so that upon energization of the relay when the tube 310 fires, the contacts 330 close, energizing the solenoid valve 308 from the circuit just described, and thus admitting compressed air to the conduit 193. If desired for smoothing purposes or the like the winding of the relay 326 may be shunted by a suitable condenser 334 as will be understood by those skilled in the art.

The terminals 335, 336 of the resistor 313, which serves to complete the thyratron grid circuit and maintain cut-off bias when no arc is being tested, may be considered the input terminals of the described voltage-responsive means for controlling the air supply to the line 193. Bearing in mind that depletion of the desired metal, e. g. uranium, on the anode of one of the arcs is manifested by a rise in the voltage drop across the arc so that a value of such voltage drop may be selected (in accordance with preliminary tests of a given arc structure under the intended operating conditions) as indicative of substantial exhaustion of the metal, it will now be seen that if the normal negative bias applied by the source 314 to the grid 311 of the thyratron is just sufficiently greater than the selected indicative value of the arc voltage drop (considered in the opposite, positive sense) to keep the tube at cut-off even when an arc having not more than such value of drop is connected across the terminals 335, 336 in opposition to the negative bias 314, then such connection of an arc having a drop greater than the indicative value will cause the tube to fire and to open the valve 308. While plugs or other manual or automatic means may be employed to connect individual arcs across the terminals 335, 336 at desired times and thus to provide the necessary electrical signal from each arc about to be loaded as the feed unit 60 travels up and down, a simplified switching arrangement is shown for example in Figs. 23 to 25.

Feed control: arc-testing switches

The transverse member 133 that rides up and down with the feed unit may carry a projecting switch-actuating structure generally designated 340, for cooperation with a plurality of switches 341 mounted stationarily in a vertical row on the upright member 66 or other suitable portion of the frame 63, the mounting of these parts being omitted from Fig. 1 and similar figures, for the sake of clarity. One switch device may be provided for each horizontal pair of ion sources at a corresponding level in the vertical travel of the actuating structure 340, and the several switches are accordingly designated 341$ah$, 341$bh$, 341$cf$ and 341$de$. Only the switch 341$ah$ is shown in mechanical detail in Figs. 23-25, but it will be understood that each of the others, indicated diagrammatically, is actually identical with the switch 341$ah$. The latter comprises upper and lower spring contact members 342$h$ and 342$a$ respectively, and mounted between them by means of insulating supporting structure 343, a central contact member 346$ah$ pivoted at 347 to swing into electrical contact with either of the members 342$h$ and 342$a$. The member 346$ah$ is normally kept in a central position out of contact with either of the other members by a pair of relatively stiff spring fingers 348, 349, and has an outwardly extending portion constituting an operating arm 350.

Suitable means are preferably provided to arrest the member 346$ah$ in its neutral or midposition when it has been swung vertically into contact with the upper or lower member and released for return under the pressure of one or the other of the springs 348, 349. For instance, a roller 352 mounted on a shaft 353 that rides in a horizontal slot in the arm 350 may be urged by a pair of small coil springs 354 against a stationary, generally vertical cam surface 355 that has a relatively deep central depression 356 rising to upper and lower surfaces 357 and 358 that extend vertically, as shown. Thus the central member 346$ah$ may be swung up or down by exerting considerable pressure on the arm 350 so as to force the roller 352 up out of the recess 356 on to one or another of the plane surfaces 357, 358; but on release of the member for free return, the force of either of the springs 348, 349 is sufficient to snap the roller 352 into the recess 356 but not out of it.

The actuating structure 340 comprises a bracket 360 extending from the crossmember 133 and carrying a supporting plate 361 to which are pivoted, at the upper and lower portions thereof respectively, the bifurcated inner ends of the switch-actuating fingers 364, 365. A spring 368 lightly urges the upper finger 364 against the upper surface 369 of one projecting portion of the plate 361 and a spring 370 similarly urges the lower finger 365 against the lower surface 371 of another projecting portion of the plate. Thus as the feed carriage including the crossmember 133 moves down, the finger 365 engages the switch arm 350 (which projects into the path of the fingers) and being retained by the surface 371, swings the arm down and closes the contacts 346$ah$—342$a$; when the carriage has dropped a certain distance further, e. g. to the dotted line position of the finger 365 in Fig. 23, the swing of the arm 350 has become sufficient for it to clear the end of the finger, and being thereby released the contact members 346$ah$, 342$a$ snap back into their normal open circuit position. On the downward stroke of the carriage, however, the upper finger 364 does not actuate the switch, but is merely flipped up, as shown in Fig. 25, against the light pressure of the spring 368. When the carriage is moving up, the action is just the reverse; the upper finger 364 then displaces the arm 350 upwardly to close the contacts 346$ah$—342$h$, while the lower finger 365 flips idly by.

The switch 341$ah$ and the remaining switches 341$bg$, 341$cf$ and 341$de$ (which are identically actuated by the structure 340, although only illustrated in a diagrammatic manner) are adapted to connect the several arcs successively across the input terminals 335, 336 of the voltage-responsive control circuit as the feed unit moves down and up. Thus the central contact members 346$ah$, 346$bg$, 346$cf$ and 346$de$ are all connected, together, to the terminal 335 by the conductor 374, and the upper and lower contact members of the switches are connected to the several arc anodes, the test circuits being completed by the conductor 375 extending to the other control terminal 336 from the arc cathodes, e. g. from their common line 305 (which may, if desired, be grounded to the tank section 30 for convenient connection of the ion accelerating potential as above described in connection with Fig. 20). Specifically as shown, the lower switch contacts 342$a$ to 342$d$ inclusive are connected respectively to the arc anodes 35$a$ to 35$d$ inclusive, while the upper contacts 342$e$ to 342$h$ are similarly connected to the anodes 35$e$ to 35$h$ of the other column of arcs.

Feed control: operation and timing

Thus as the feed unit carriage moves down past the arcs $a$ to $d$, the finger 365 successively closes the sets of contacts 346$ah$—342$a$, 346$bg$—342$b$, 346$cf$—342$c$, and 346$de$—342$d$, so that the voltage drops across the arcs are successively applied in the grid circuit of the tube 310 for operation of the solenoid valve 308 and of the wire-advancing mechanism in each instance where the voltage drop then exceeds the predetermined value indicative of exhaustion of the anode-carried supply of material, e. g. uranium, to be ionized. Likewise on the upward travel of the feed carriage, the sets of contacts 346de—342e, 346cf—342f, 346bg—342g, and 346ah—342h are successively closed by the finger 364, to provide corresponding tests (by the tube 310) of the arcs e to h for voltage rise above the indicative value. It will be noted that in each instance the test connection is directly to the anode and cathode of the arc, the voltage being individually determinable for each arc since its anode is in effect isolated from the positive side of the common E. M. F. supply 304, by its individual one of the ballast resistors 306a to 306h. As will now be readily appreciated, each switch structure is preferably such that the duration of contact closure by either the finger 365 or the finger 364 is at least substantially less than the duration of one revolution of the shaft 100, it being only necessary that the contacts be closed just before and as the ports 190, 191 (Fig. 8) register in the course of each particular revolution wherein arc feed might take place, and that the contacts not be closed during those revolutions of the shaft which occur intermediate the traversals of the delivery tube 61 past the desired feed positions (Figs. 17–19, 21 and 22).

For example, the spacing of the fingers 364, 365 on the plate 361 and the position of the latter relative to the feed unit carriage may be chosen in such fashion that as the shaft 100 moves downward the finger 365 closes the contacts 364ah—342a when the key 119 is at the point 380 in the helical groove 121 (Fig. 22), the contacts being kept closed until the point 278X is well past the key, and also in such fashion that as the shaft moves upward the finger 364 closes the contacts 346ah—342h when the key is at the point 381 in the groove 122, the contacts being kept closed until the point 288B is well past the key, it being understood that contact closure by the fingers occurs at corresponding points and regions for the other arcs in each column. Although for structural convenience and certainty of electrical response of the relay 326 and the valve 308 the contacts may thus be closed and hence (if the arc voltage drop is high) may open the valve well ahead of the feed tube positions X in Fig. 19 and B in Fig. 17, actual wire advance only occurs at those positions, i. e. when the sleeve valve formed by ports 190—191 (Fig. 8) is opened so that air supplied to the line 193 can be admitted to displace the piston 172. It will also be understood that although batteries are shown for simplicity in the drawings, the several current or voltage sources may be of other appropriate types, e. g. rectifier systems fed by A. C., or D. C. generators.

*Summary of operating procedure*

The operation of the entire structure should now be readily apparent. It may be assumed, for example, that the apparatus has been assembled in so-called sandwich relation with a pair of mass spectro-separating devices as shown in Figs. 1 and 20, that the feed unit reel holders have been supplied with wire of the metal to be ionized (e. g. uranium), that the wire has been initially threaded through the passage 174, jaws 183, passage 182, seal 200 and feed tube 211, that the enclosed structure including the source tank section 30 and the communicating tubes 32 and 33 has been evacuated to the desired very low pressure, and that the various energizing circuits for the arcs and for the control system in Fig. 23 have been completed. Assuming further that the ion source anodes have been preliminarily loaded with portions of metal to be ionized, the arcs may be struck as a result of heating by electron bombardment from cathode to anode. Initiation of discharge can be facilitated, if necessary, by admitting an inert gas such as argon or helium at a suitable, usually low pressure, the residue of gas being thereafter effectively removed by further operation of the pumping instrumentalities, e. g. after vaporization of the supplied metal has become sufficient to sustain the arcs. In some cases, in lieu of a preliminary loading of metal, the arcs may be wholly started in the inert gas and the operation of the feeding apparatus relied upon to supply each arc with its first portion of metal as well as the necessary replenishments thereof. In any event, when the arcs are well started and generating metal ions, the accelerating potential from the source 296 may be applied to the screens 295 and 298 to withdraw the desired ion beam down each of the tubes for supplying the remainder of the isotope separating apparatus (not shown), which can also be placed and thereafter continuously maintained in operation.

At least as soon as the arcs are struck, the driving motor 95 may be started so that with the clutch 98 engaged and through the instrumentality of the gear box 64, the shafts 100 and 100′ are set in rotation. At the same time by virtue of the engagement of the helical groove of each shaft with its key the shafts rise and fall together, carrying with them the feed units 60 and 60′ and the crossmember 133, and thus reciprocating between the solid and dotted line positions of Fig. 1 so that the lower ends of the delivery tubes 61 and 61′ sweep helically past the ion sources of the cooperating pairs of columns $a$—$h$ and $a'$—$h'$. Referring specifically to the operation of the unit 60 but bearing in mind that the unit 60′ is identical in its structure, appurtenances and function, it may be assumed that the shaft 100 is starting downward from its uppermost position, with the key 119 engaging the groove 121 (Fig. 22). As the delivery tube 61 approaches the anode 35a of the arc $a$ (Fig. 19) and the key 119 thus reaches the point 380, the finger 365 has engaged the arm 350 (Fig. 23) and closed the contacts 346ah—342a whereby the anode and cathode of the arc $a$ are connected to the input terminals 335, 336 of the tube 310. If the voltage drop across the arc is greater than a value predetermined by the adjustment of the bias control 317 (it being understood that if the arcs do not all have identical characteristics, each may be shunted by a high-resistance voltage divider, not shown, having a variable output to match the arc to a common setting of the bias control), the tube 310 fires, energizing the relay 326 and actuating the solenoid valve 308 to supply compressed air to the line 193.

Then when the end of the delivery tube 61 reaches the arc $a$, the ports 190 and 191 register (Fig. 8) so that the piston 172 is displaced to move the jaws 183 against and with the piston 178. The wire 170 is thus advanced a predetermined length, depending on the position from which the piston 172 began its displacement (as determined by the setting of the stop device 166), and the portion 170X consequently protruding from the end of the feed tube 211 (Fig. 19) promptly melts upon the anode 35a, to remain as a molten coating for vaporization and ionization as explained hereinabove. Ordinarily it may be expected that the advanced wire will fully melt into the arc as the feed tube moves past, but if necessary the clutch 98 may be momentarily disengaged (either manually or automatically, for example, in response to the feed unit acquiring the electrical potential of the anode or of the arc, through the wire) to arrest the feed tube for a short time adjacent the arc. On the other hand, if the voltage drop measured by the tube 310 across the test input 335—336 is below the value indicative of approaching exhaustion of metal, e. g. uranium, on the arc anode 35a, the tube will remain cut off, the solenoid valve 308 will remain closed and the delivery tube will pass the arc without feeding wire.

As the feed tube continues past the remaining ion sources b, c and d in its downward travel, similar voltage-sensing operations occur, each likewise followed by advance and feed of wire if conditions require. Eventually the upper end of the groove 121 (Fig. 22) reaches the key 119, and after the transfer recess 128 has passed the key, the groove 122 cooperates to move the shaft 100 and the feed unit on its upward course. In such travel, for example, the voltage drop across the arc e is tested upon closure of the contacts 346de—342e by the finger 364, and wire is advanced if necessary, as the delivery tube passes below the anode 35d of the opposite source d (e. g., at positions B and B' of Figs. 17 and 18) in an earlier stage of the same revolution wherein the tube sweeps past the anode 35e. Then as the tube so passes the arc e (position C of Figs. 17 and 18), the advanced portion of wire melts off, to replenish the supply on the anode 35e. Similar testing and feeding or non-feeding operations occur with respect to the arcs f, g and h as the feed unit and delivery tube continue rising, and finally the lower cross-over recess 129 reaches the key 119, for repetition of the entire up-and-down cycle. It will be understood that during the described movements of the feed unit 60 and its tube 61, the other unit and delivery tube 60'—61' have been driven through a like cycle of operations for the benefit of the arcs a' to h', with the cooperation of electrical testing and control instrumentalities (not shown) identical to those illustrated for the unit 60 in Fig. 23.

The feeding cycles of the units 60 and 60' are continuously and automatically repeated under the continuous drive of the motor 95 so as to keep the several ion sources supplied with metal to be ionized, withdrawn in wire form from the reels carried on the shafts 100, 100'. The speed of rotation of the shafts and the setting of the bias control 314 are preferably so coordinated with the operating characteristics of the arcs that each of the latter may be assured of replenishment of metal at least by the time its supply is fully exhausted; for instance, if the latter event is likely to occur after five to ten minutes of operation, the period of each complete up-and-down cycle of the feed units may be of the order of one to five minutes, preferably one or two minutes for best assurance of uninterrupted ion supply from all arcs. In some cases, as with carefully uniform design of the ion sources, the time of metal depletion of the arcs may be so regular and uniform that the voltage signals for feed control can be dispensed with, and the feed units driven at an appropriately slow rate and in such fashion (e. g. by omitting the tube 310 and utilizing the contacts 341 to control the solenoid valve 308 directly) as to feed wire into each arc every time the delivery tube passes. It may also be noted that although in any type of operation precautions are preferably taken to prevent the complete exhaustion of metal supply of any arc at any time, experience has indicated that in multiple source structures such an occurrence is unlikely to result in extinction of the arc concerned, and that the relatively dense atmosphere of ions and vapor caused by the other arcs in the same region will tend to maintain the discharge for a considerable time, i. e. until the next wire feeding operation.

It will now be seen that the described apparatus provides continuously operating feeding mechanism for supplying material automatically as needed to each of a plurality of arc discharge devices wherein the material is vaporized and ionized and from which a copious supply of ions may be continuously or intermittently withdrawn. The apparatus includes reliable and readily adjusted and controlled wire-advancing means of pneumatically actuated character, together with driving means and cooled wire-delivery means of simple but peculiarly effective nature, all cooperating with each other and with the associated ion sources and the evacuated envelope of the latter, to attain the desired feeding operation and to provide a variety of other advantages, including electrical isolation of the wire feed devices, minimization of the number of vacuum seals or other means required for traversing the evacuated envelope, and minimization of structure exposed to ion bombardment or other deteriorating influences.

*Alternative structures*

Fig. 26 illustrates certain modifications of structural detail that may be desirable in some instances of the practice of the invention, it being understood that parts not shown in this figure, such as the carriage, supporting and driving instrumentalities, and the general arrangement of the ion sources, compressed air supply and control circuit, may be the same as the corresponding structure in other figures. In Fig. 26 the feed unit 1060 and its delivery tube 1061, identical with the unit 60 and tube 61 of Fig. 1 except as hereinafter described, are even less subject to ion bombardment, being disposed in the plane of the ion sources, i. e. so that the axis of the tube and of the drive shaft 1100 is directly between the two columns of sources represented by the arcs aa and hh. The curved portion of the tube 1061 is of somewhat less extent or of shorter radius, assuming the same dimensions of the ion source assembly as in other figures, so that the end of the tube clears the arc electrodes as it sweeps past. Instead of having but a single sleeve-valve projection 1132a of the sleeve 1132 and thereby providing for only one advance of wire per revolution, the feed unit 1060 has another identical projection 1132b on the opposite side of the device, i. e. such that another port 1191b and nipple 1192b are disposed 180° away from the corresponding port in the projection 1132a and its nipple 1192. The air conduit 1193 may accordingly have two branches 1193a and 1193b respectively communicating with the nipples 1192 and 1192b, and thus compressed air may be admitted through the port in the sleeve 1161 (i. e. the port 190 in Fig. 8) to displace the wire-advancing piston when the shaft is in either of two opposite angular positions, for example when the end of the delivery tube 1061 is adjacent either of the arc anodes 1035aa and 1035hh.

In consequence, if the feed unit simultaneously advances wire and deposits it on the anode of each of the right hand column of arcs on the downward trip of the unit, the advance of wire may be similarly simultaneous with wire deposit, i. e. with projection of the wire upon an anode, in feeding the left hand column of arcs on the upward trip. Although actuating members similar to the fingers 364, 365 may be employed for actuating each of the switches 341 in the control apparatus of Fig. 23, an alternative structure is shown in Fig. 26 (which if desired may also be adapted for use in the structure of Figs. 1–23, as will hereinafter become apparent), comprising a pair of angularly sloping shelf-like projections or cam plates 1364, 1365, carried and rotated by an upward extension 1124a at the upper end of the shaft 100. Each of the plates is, in plan, shaped like a sector of an annulus, having a curved outer edge and side edges extending radially from the surface of the shaft portion 1124a (i. e. as if originating at the axis of the latter), the angular extent of each plate being say, about 90°, and the two being disposed on opposite sides of the shaft but spaced vertically as shown.

Considering the shaft as viewed from above, and assuming that it rotates clockwise, the plate 1365 slopes downward in a counterclockwise direction and is adapted to engage the switch arm 1350 and cam it downwardly into closed position of the lower contacts of the switch, as the delivery tube swings down to and past the arc anode 1035aa on the down stroke; the disposition of the plate 1365 being also such that on the upstroke, when the helical groove 122 is traversed by the key 119 (Figs. 5 and 22), the plate sweeps past the arm 1350 (in its normal position as indicated by dotted lines) without touching. The plate 1364 slopes in an opposite direction and is similarly disposed so as to cam the arm 1350 into closed position of its upper contacts when the delivery tube sweeps up to and across the arc anode 1035hh on the upstroke, but so as to miss touching the arm 1350 on the downstroke. Thus as the shaft moves down, the cam plate 1365 successively connects the control instrumentalities (see Fig. 23) with the arcs of the right hand column, and compressed air is admitted to the line 1193 (and through the tube 1193a to the piston) for advance of wire if needed; on the upward travel of the shaft, similar connection and feed if necessary (by admission of compressed air through the tube 1193b) are effected with respect to the left hand column.

As illustration of another of many types of ion source that may be used with the invention, the arcs in Fig. 26 are arranged with their cathodes 1036aa, 1036hh disposed below their respective anodes, this construction being sometimes preferable for economy in consumption of the metal to be ionized. It will also be appreciated that if such arc arrangement is used in the apparatus of Fig. 1, it is desirable (in order to avoid unwanted feed by a protruding portion of wire passing below an anode) to use a mode of operation somewhat the reverse of that previously described by way of example, for instance, by driving each feed shaft in a counterclockwise rather than clockwise direction and by adjusting the parts so that actual advance of wire, during either the up or down stroke of the feed unit, takes place when the delivery tube is passing a vertical line through the left hand column of arcs.

Recapitulating from the foregoing description a number of further advantages of the invention will be apparent to those skilled in the art. By having a plurality of ion sources arranged in close proximity as in the present invention an abundant and relatively intense beam of ions may be produced enabling separation of isotopes of the ionized material in quantity. Difficulties due to overheating are minimized by reason of the plurality of individual ion sources. The feeding arrangement provided necessitates only a single opening into the evacuated chamber and thus the amount of pressure sealing is minimized and since a single feeding device feeds to a number of ion sources the amount of water jacketing required for cooling purposes is minimized. In all, the described apparatus and methods provide for efficient generation of ions in large quantities, and particularly for highly advantageous, automatic and continuous feeding of the material to be ionized.

It is to be understood that the invention is not limited to the specific apparatus and procedure herein shown or described, but may be carried out in other ways without departure from its spirit.

What is claimed is:

1. In apparatus of the character described, in combination, a plurality of ionizing devices each adapted to receive material to be ionized, means for holding a supply of said material, and feeding means including a delivery device movable into the vicinity of each of said ionizing devices in succession, for advancing material from said supply means to each of said ionizing devices.

2. In apparatus of the character described, in combination, a plurality of ionizing devices each adapted to receive material to be ionized, said devices being disposed in a common plane for simultaneous withdrawal of ions from them, means for holding a supply of material to be ionized, and feeding means including a delivery device movable through a path touching said plane in the vicinity of each of said ionizing devices, for advancing material from said supply means to said ionizing devices in succession.

3. In apparatus of the character described, in combination, a plurality of ionizing devices each adapted to receive material to be ionized, means for holding a supply of said material, and feeding means for advancing material from said supply means to each of said ionizing devices.

4. In apparatus of the character described, in combination, a plurality of ion sources including ionizing means, means forming a gas-tight space, said ion sources being within said space, feeding means for feeding material to be ionized to said ionizing means, said feeding means including means within said gas-tight space, said last means being rotatable and reciprocatable so as to be operable to feed said material to a plurality of said sources.

5. In apparatus of the character described, in combination, an extended ion source structure adapted to receive material at a plurality of localities, for generating ions of said material, and feeding means including a delivery device movable to deliver material to said source structure at each of said localities, for advancing material to said ion source structure for ionization thereby.

6. In apparatus of the character described, in combination, a plurality of ion sources including ionizing means, arranged in proximity, feeding means for feeding material to be ionized to said ionizing means, means for bodily rotating said feeding means and said feeding means having a delivery portion spaced from the axis of rotation whereby a plurality of said ion sources may be served by said feeding means.

7. In apparatus of the character described, in combination, a plurality of ion sources including ionizing means, arranged in proximity, means for feeding material to be ionized to said ionizing means, and means for automatically moving said feeding means so as to feed individually to a plurality of said ion sources in accordance with a predetermined program.

8. In apparatus of the character described, in combination, extended ion source means adapted to receive material at a plurality of localities, for generating ions of said material, means for holding a supply of said material, and feeding means including a delivery device movable through a predetermined path traversing said localities in succession, for advancing material from said supply means to said ion source means at each of said localities.

9. In apparatus of the character described, in combination, means forming a gas-tight space, extended ion source means disposed in said space and adapted to receive material at a plurality of regularly spaced localities therein, for generating ions of said material, means disposed externally of said first mentioned means, for holding a supply of said material, and feeding means for advancing material from said supply means to said ion source means at each of said localities, said feeding means including a material-handling portion pressure sealed in said first mentioned means for transfer of material into the gas-tight space, and a delivery portion movable through a curved path traversing said regularly spaced localities in succession.

10. In apparatus of the character described, in combination, a plurality of ion sources including ionizing means, means forming a gas-tight space, said ion sources being arranged in proximity within said gas-tight space, feeding means for feeding the material to be ionized to said ionizing means, said feeding means having a delivery portion within said gas-tight space, and pressure sealing means associated with said feeding means whereby material to be ionized may be brought within the gas-tight space from the exterior thereof without leakage of pressure and means whereby said delivery portion may be moved so as to feed material to be ionized to a plurality of said ion sources.

11. In apparatus of the character described, in combination, a plurality of ion sources including ionizing means, means forming a gas-tight space, said ion sources being arranged in proximity within said gas-tight space, feeding means for feeding the material to be ionized to said ionizing means, said feeding means having a delivery portion within said gas-tight space, and pressure sealing means associated with said feeding means whereby material to be ionized may be brought within the gas-tight space from the exterior thereof without leakage of pressure and means whereby said delivery portion may be rotated whereby material to be ionized may be fed to a plurality of said ion sources.

12. In apparatus of the character described, in combination, a plurality of ion sources including ionizing means, means forming a gas-tight space, said ion sources being arranged in proximity within said gas-tight space, feeding means for feeding the material to be ionized to said ionizing means, said feeding means having a delivery portion within said gas-tight space, and pressure sealing means associated with said feeding means whereby material to be ionized may be brought within the gas-tight space from the exterior thereof without leakage of pressure and means whereby said delivery portion may be reciprocated so as to be adapted to feed material to be ionized to a plurality of said ionizing sources.

13. In apparatus of the character described, in combination, a plurality of ion sources including ionizing means, means forming a gas-tight space, said ion sources being arranged in proximity within said gas-tight space, feeding means for feeding the material to be ionized to said ionizing means, said feeding means having a delivery portion within said gas-tight space, and pressure sealing means associated with said feeding means whereby material to be ionized may be brought within the gas-tight space from the exterior thereof without leakage of pressure, and means whereby said delivery portion may be rotated and reciprocated so as to be adapted to feed material to be ionized to a plurality of said ion sources.

14. In apparatus of the character described, in combination, means forming a gas-tight space, extended ion source means disposed in said space and adapted to receive material at a plurality of localities therein, for generating ions of said material, means disposed externally of said first mentioned means, for holding a supply of said material feeding means for advancing material from said supply means to said ion source means at each of said localities, said feeding means including conduit means having a delivery portion and movable through said first mentioned means for discharge of material at said localities in succession, and sliding seal means intermediate said movable conduit means and said first mentioned means, to maintain gas-tight integrity of said space.

15. In apparatus of the character described, in combination, means forming a gas-tight space, extended ion source means disposed in said space and comprising electric-discharge-establishing electrodes, said source means being adapted to receive solid material at a plurality of localities in said space, for vaporization and ionization of said material by electric discharge, means disposed externally of said first mentioned means, for holding a supply of said solid material, and feeding means for advancing said material from said supply means to said source means, said feeding means including conduit structure through which the material is advanced, having a movable delivery portion for depositing material at each of said localities and having sliding seal means traversable by the solid material, to maintain gas-tight integrity of said space.

16. In apparatus of the character described, in combination, a plurality of ion sources including ionizing means, means forming a gas-tight space, said ion sources being arranged in proximity within said gas-tight space, feeding means for feeding the material to be ionized to said ionizing means, said feeding means having a delivery portion within said gas-tight space, and pressure sealing means associated with said feeding means whereby material to be ionized may be brought within the gas-tight space from the exterior thereof without leakage of pressure, and means whereby said feeding means may be bodily moved so as to cause material to be ionized to be individually fed to a plurality of said ion sources.

17. In apparatus of the character described, in combination, a plurality of ion sources including ionizing means, means forming a gas-tight space, said ion sources being arranged in proximity within said gas-tight space, feeding means for feeding the material to be ionized to said ionizing means, said feeding means having a delivery portion within said gas-tight space, and pressure sealing means associated with said feeding means whereby material to be ionized may be brought within the gas-tight space from the exterior thereof without leakage of pressure, and means whereby said feeding means may be bodily rotated and reciprocated so that material to be ionized may be fed individually to a plurality of said ion sources.

18. In apparatus of the character described, in combination, extended ion source means adapted to receive material at a plurality of localities spaced along a helical path, for generating ions of said material, and means for feeding said material to said source means, including conduit means traversable by the material and having a delivery portion disposed to extend from the axis of said helical path into intersection with said path, means for advancing material along said conduit means, and means for rotating said conduit means and for displacing the same axially of said helical path, for effecting delivery of said material at each of said localities.

19. In apparatus of the character described, in combination, extended ion source means including a plurality of spaced electrical discharge devices each having an electrode adapted to receive material in wire form, for vaporizing and ionizing said material, and means for feeding wire of said material to said electrodes, said feeding means including a delivery conduit for the wire and means for moving said conduit to bring it successively into proximity with each of said electrodes.

20. In apparatus of the character described, in combination, a plurality of ion sources including ionizing means, means forming a pressure-tight chamber, said ion sources being arranged in proximity within said pressure-tight chamber, feeding means for feeding material to be ionized in the form of a wire to said ionizing means, said feeding means having a delivery portion within said gas-tight chamber, pressure sealing means associated with said feeding means whereby said wire material to be ionized may be introduced into said chamber from the exterior thereof without leakage of pressure, means whereby said delivery portion may be moved so as to individually feed material to be ionized to a plurality of said ion sources, and said feeding means and said pressure sealing means being cooperatively constructed and arranged for effecting feeding operation to a plurality of the ion sources without pressure leakage, said feeding means comprising mechanism for feeding said wire material intermittently in increments, and said mechanism comprising means for simultaneously engaging said wire material and advancing it in said feeding means.

21. In apparatus of the character described, in combination, extended ion source means adapted to receive material in wire form at each of a plurality of spaced localities accessible along a path curved about a predetermined axis, for vaporizing and ionizing said material, and means for feeding wire of said material to said source means, said feeding means including mechanism for advancing the wire along said axis, a wire delivery conduit receiving wire from said mechanism along said axis and extending radially from said axis to intercept said curved path for depositing wire at each of said localities, and means for rotating said mechanism and conduit about said axis.

22. In apparatus of the character described, in combination, extended ion source means adapted to receive solid material at each of a plurality of localities spaced along a predetermined path, for vaporizing and ionizing said material, and means for feeding said material to said source means at said localities, said feeding means comprising a conduit having a delivery end, mechanism including an expansible chamber and a material-engaging device actuated thereby, for advancing successive portions of solid material into and along said conduit in response to expansion of said chamber, means for cyclically moving said mechanism and conduit to carry the delivery end of the latter repeatedly along said predetermined path, and means associated with said mechanism, and controllable in response to the position thereof, for supplying fluid under pressure intermittently to said chamber to expand the same.

23. In apparatus of the character described, in combination extended ion source means adapted to receive material in wire form at each of a plurality of localities spaced along a straight line, for vaporizing and ionizing said material, and means for feeding wire of said material to said source means, comprising a wire-guiding conduit disposed parallel to said line at a predetermined distance therefrom and having a delivery portion extending sidewise for about said distance, means for holding a supply of wire of said material, mechanism including an expansible chamber and a wire-engaging device actuated thereby, for advancing successive portions of wire from said supply means into and along said conduit in response to expansion of said chamber, said supply means, mechanism and conduit being mounted together as a movable feed assembly, means for rotating said assembly about the axis of the conduit and for reciprocating said assembly lengthwise of said axis, to move the delivery portion of the conduit past the aforesaid localities in succession, and means associated with said mechanism and controllable in response to the angular position thereof about said axis, for supplying fluid under pressure intermittently to said chamber to expand the same.

24. Apparatus for feeding wire to each of a plurality of localities spaced from a predetermined line, comprising a wire-guiding conduit disposed with its axis along said line and having an offset portion for wire delivery to said localities, means for holding a supply of wire, mechanism including an expansible chamber and a wire-engaging device actuated thereby, for advancing successive portions of wire from said supply means into and along said conduit in response to expansion of said chamber, said supply means, mechanism and conduit being mounted together as a movable feed assembly, means for rotating said assembly about the axis of the conduit and for reciprocating said assembly lengthwise of said axis, to move the delivery portion of the conduit past the aforesaid localities in succession, and means associated with said mechanism and controllable in response to the position thereof, for supplying fluid under pressure to said chamber to expand the same.

25. In apparatus of the character described, a mechanism for feeding wire-like material to a delivery point, said mechanism including means adapted to engage and disengage the material, resilient means for moving the last mentioned means and the material in a direction toward the delivery point, said resilient means including an expansible chamber adapted to be operated by a fluid under pressure.

26. In apparatus for feeding wire, in combination, a wire-guiding conduit rotatable about its axis and means for feeding wire into and along said conduit, comprising wire-engaging means reciprocable lengthwise of said axis, an expansible chamber for displacing said wire-engaging means, means to maintain said wire-engaging means in engagement with the wire during expansion of the chamber, said last mentioned means and said wire-engaging means being cooperatively adapted to release the wire during contraction of the chamber, and said wire-engaging means, chamber and engagement-maintaining means being mounted for rotation with said conduit, and means including cooperating port structures respectively stationary and rotatable with said chamber, for intermittently supplying fluid under pressure to said chamber.

27. In apparatus for feeding wire, in combination, a wire-guiding conduit reciprocable along its axis for delivering wire at a plurality of localities spaced lengthwise of said axis, and means for feeding wire into and along said conduit, comprising wire-engaging means reciprocable lengthwise of said axis relative to said conduit, an expansible chamber for displacing said wire-engaging means, means to maintain said wire-engaging means in engagement with the wire during expansion of the chamber, said last mentioned means and said wire-engaging means being cooperatively adapted to release the wire during contraction of the chamber, and said wire-engaging means, chamber and engagement-maintaining means being mounted for reciprocation with said conduit, and means including flexible conduit means connected to said chamber and adapted for connection to a source of fluid under pressure, for intermittently supplying fluid under pressure to said chamber.

28. In wire-feeding apparatus, in combination, chamber structure having opposed movable and fixed walls, a wire-guiding conduit opening through and carried by the movable wall, said conduit extending through the opposite fixed wall of the chamber and being adapted to slide axially in said fixed wall, releasable wire-gripping means adapted to receive wire traversing said conduit and disposed for displacement by said movable wall, means to maintain said wire-gripping means in engagement with the wire during displacement of the movable wall away from the fixed wall, and intermittently controllable means for supplying fluid under pressure to said chamber to effect said displacement of the movable wall.

29. In wire-feeding apparatus, in combination, a pair of opposed pistons each having an associated chamber and an axially pierced stem traversing the associated chamber, one of said pistons having a larger fluid-pressure-receiving face exposed in its chamber than the other, movable means disposed between and actuated by said pistons for gripping a wire guided through said stems, said gripping means being adapted to release the wire in response to absence of opposing pressure between said pistons, and means for supplying fluid under pressure to said chambers to effect reciprocation of said pistons for advance of successive portions of wire by said gripping means.

30. In apparatus of the character described, in combination, a feeding mechanism for feeding wire or the like including pressure responsive means for engaging and advancing the wire, means forming a sleeve-like supporting member for said mechanism, said mechanism having a portion contiguous to said member, means for moving said mechanism relative to said member, and said member and portion having cooperating ports whereby fluid under pressure may be admitted to said pressure responsive means for feeding wire.

31. In apparatus of the character described, in combination, a feeding mechanism for feeding wire or the like including pressure responsive means for engaging and advancing the wire, means forming a sleeve-like supporting member for said mechanism, said mechanism having a portion contiguous to said member, means for moving said mechanism relative to said member, and said member and portion having cooperating ports whereby fluid under pressure may be admitted to said pressure responsive means for feeding wire, said moving means including means for imparting reciprocating movement to the feeding mechanism and supporting member together.

32. In apparatus of the character described, in combination, a feeding mechanism for feeding wire or the like including pressure responsive means for engaging and advancing the wire, means forming a sleeve-like supporting member for said mechanism, said mechanism having a portion contiguous to said member, means for moving said mechanism relative to said member, and said member and portion having cooperating ports whereby fluid under pressure may be admitted to said pressure responsive means for feeding wire, means forming a pressure-tight chamber, and said feeding means being so associated with said chamber as to be operable to feed wire to the interior thereof.

33. In apparatus of the character described, in combination, a plurality of ion sources including ionizing means, arranged in proximity, means for feeding material to be ionized to said ionizing means, means for automatically moving said feeding means so as to feed individually to a plurality of said ion sources in accordance with a predetermined program and automatic means whereby said feeding means is adapted to feed when the latter means is in the appropriate position relative to an ionizing means.

34. In apparatus of the character described, in combination, a plurality of ion sources including ionizing means, means forming a pressure-tight chamber, said ion sources being arranged in proximity within said pressure-tight chamber, feeding means for feeding material to be ionized to said ionizing means, said feeding means having a delivery portion within said gas-tight chamber, pressure sealing means associated with said feeding means whereby material to be ionized may be introduced into said chamber from the exterior thereof without leakage of pressure, means whereby said delivery portion may be moved so as to individually feed material to be ionized to a plurality of said ion sources, said feeding means and said pressure sealing means being cooperatively constructed and arranged for effecting feeding operation to a plurality of the ion sources without pressure leakage, and automatic means whereby said feeding means is adapted to feed when the latter means is in the appropriate position relative to an ionizing means.

35. In apparatus of the character described, in combination, a plurality of ion sources including ionizing means, means forming a pressure-tight chamber, said ion sources being arranged in proximity within said pressure-tight chamber, feeding means for feeding material to be ionized in the form of a wire to said ionizing means, said feeding means having a delivery portion within said gas-tight chamber, pressure sealing means associated with said feeding means whereby said wire material to be ionized may be introduced into said chamber from the exterior thereof without leakage of pressure, means whereby said delivery portion may be moved so as to individually feed material to be ionized to a plurality of said ion sources, and said feeding means and said pressure sealing means being cooperatively constructed and arranged for effecting feeding operation to a plurality of the ion sources without pressure leakage, said feeding means comprising mechanism for feeding said wire material intermittently in increments, said mechanism comprising means for simultaneously engaging said wire material and advancing it in said feeding means and said mechanism having associated automatic means whereby the feeding means is adapted to feed the wire material when said delivery portion is in an appropriate position relative to an ionizing means.

36. In apparatus of the character described, in combination, extended ion source means adapted to receive material at a plurality of localities, for vaporizing and ionizing said material, mechanism for advancing successive quantities of said material from a supply thereof, a delivery conduit for guiding said material advanced by said mechanism, means including means rotating said conduit, for moving said conduit to deposit the material at each of said localities in succession, said conduit having jacket means for circulation of a fluid coolant therein and having a cylindrical surface ported for coolant communication into said jacket, and means stationary relative to rotation of said conduit and including a ported cylindrical surface concentric with the aforesaid surface and in bearing relation thereto, for supplying fluid coolant to the jacket, one of said surfaces having an annularly grooved configuration to provide continuous communication between ports in both surfaces during rotation of the conduit.

37. In apparatus of the character described, in combination, extended ion source means including a plurality of spaced electrical discharge devices each adapted to receive a supply of material, for vaporizing and ionizing said material, and means for feeding successive quantities of the material to the discharge devices, said feeding means including a delivery device for the material, means for moving said delivery device successively into proximity with each of said discharge devices, means controlled by said discharge devices for developing an electric signal representative of depletion of the supply of material at each discharge device, and means controlled by said last mentioned means and in accordance with the position of the delivery device, for controlling the feeding means to effect replenishment of supply of material when depleted at each discharge device.

38. The combination of claim 37, wherein the feeding means includes means actuated by fluid under pressure for advancing the material through the delivery device and fluid supply means including means controlled by the position of the delivery device for conditioning the advancing means to receive fluid supply upon each approach of said delivery device to position for feed to a discharge device, the aforesaid controlling means including a normally closed valve in the fluid supply means and means electrically controlled by the electric signal means for opening said valve.

39. In apparatus of the character described, in combination, a plurality of ionizing devices disposed in spaced relation in a common plane, each device being adapted to receive material to be ionized and each being adapted for withdrawal of ions from both sides of said plane, feeding means including a delivery device movable through a predetermined path passing said ionizing devices in succession, for advancing quantities of said material to said devices, and means for withdrawing ions from said devices on both sides of said plane.

40. In apparatus of the character described, in combination, an enclosure, ion source means therein comprising a plurality of spaced parallel rows of electrical discharge devices spaced in each row, for vaporizing and ionizing material supplied to said devices, and means for feeding said material to said source means, including a material-guiding conduit extending into said enclosure along an axis parallel to said rows of discharge devices and having an offset portion for delivering material to individual devices, and means including driving mechanism for rotating said conduit and for reciprocating the same axially, to move the conduit axially in one direction while carrying the offset portion in a helical path traversing the devices of one of said rows and to return the conduit axially in an opposite direction while carrying the offset portion in a helical path traversing the devices of another of said rows.

41. In apparatus of the character described, in combination, an enclosure of electrically conductive material, extended ion source means therein, including a plurality of spaced electrical discharge devices, for vaporizing and ionizing material supplied thereto, each of said devices comprising a pair of electrodes, at least one of said pair of electrodes being adapted to receive a quantity of said material, and at least certain of said electrodes being connected in electrical circuit with said enclosure, and means for feeding material to said discharge devices, said feeding means including a delivery device within said enclosure, means for moving said device to bring it successively into proximity with each of said material-receiving electrodes, and means electrically insulating said delivery device from said enclosure and said source means.

42. The combination of claim 41, wherein the feeding means includes material holding and advancing means for advancing successive quantities of material through said delivery device, mounted for movement with said delivery device by the means for moving the latter, and wherein the insulating means includes an electrically insulating coupling intermediate the means for moving said delivery device, and the said device and associated means moved thereby.

ROBERT R. WILSON.

No references cited.